US012041399B2

(12) United States Patent
Kim

(10) Patent No.: US 12,041,399 B2
(45) Date of Patent: Jul. 16, 2024

(54) ELECTRONIC DEVICE FOR STORING EXTERNAL ELECTRONIC DEVICE

(71) Applicant: Samsung Electronics Co., Ltd., Gyeonggi-do (KR)

(72) Inventor: Dumin Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 17/879,073

(22) Filed: Aug. 2, 2022

(65) Prior Publication Data

US 2022/0369008 A1 Nov. 17, 2022

Related U.S. Application Data

(63) Continuation of application No. PCT/KR2021/000786, filed on Jan. 20, 2021.

(30) Foreign Application Priority Data

Feb. 3, 2020 (KR) ........................ 10-2020-0012744

(51) Int. Cl.
*H04R 1/02* (2006.01)
*H01F 7/02* (2006.01)
*H04R 1/10* (2006.01)

(52) U.S. Cl.
CPC ................. *H04R 1/02* (2013.01); *H01F 7/02* (2013.01); *H04R 1/1016* (2013.01); *H04R 2420/07* (2013.01)

(58) Field of Classification Search
CPC .... H04R 1/02; H04R 1/1016; H04R 2420/07; H04R 1/1025; H04R 2460/17;
(Continued)

(56) References Cited

U.S. PATENT DOCUMENTS 10,003,880 B2 6/2018 Wagman et al.
10,003,881 B2 6/2018 Cousins et al.
(Continued)

FOREIGN PATENT DOCUMENTS

CN 210781280 U 6/2020
JP 2018-110417 A 7/2018
(Continued)

OTHER PUBLICATIONS

Notice of Patent Grant dated Jan. 22, 2024.

*Primary Examiner* — Tuan D Nguyen
(74) *Attorney, Agent, or Firm* — Cha & Reiter, LLC

(57) ABSTRACT

An electronic device including a housing configured to accommodate a first portion of a bracket, the bracket defining a second portion having seating space in which the at least one earbud is at least partially accommodated; and a cover rotatably connected to the housing and configured to cover the second portion of the bracket, a third portion of the bracket being exposed to an exterior of the housing while covering an edge portion of the housing, the third portion includes at least one protrusion protruding inward toward the edge of the housing, the edge portion of the housing includes at least one groove, corresponding to the at least one protrusion and providing a space in which the at least one protrusion is movable, and the bracket transitions between a first position and a second position depending on positions of the at least one groove and the at least one protrusion.

15 Claims, 17 Drawing Sheets

(58) Field of Classification Search
CPC ....... H04R 1/1041; H04R 1/1075; H01F 7/02; H01F 7/0252; A45C 11/00; A45C 13/12; A45C 13/1069; A45C 2011/001
See application file for complete search history.

(56) References Cited

U.S. PATENT DOCUMENTS

| | | | | |
|---|---|---|---|---|
| 10,582,287 | B2 | 3/2020 | Song et al. | |
| 2017/0093453 | A1 * | 3/2017 | Panecki | B65D 43/16 |
| 2020/0107106 | A1 * | 4/2020 | Sang | G01V 3/081 |
| 2020/0304898 | A1 | 9/2020 | Cohen et al. | |

FOREIGN PATENT DOCUMENTS

| | | | |
|---|---|---|---|
| KR | 10-1570375 | A | 11/2015 |
| KR | 10-2019-0000873 | A | 1/2019 |
| KR | 10-2019-0021033 | A | 3/2019 |
| KR | 10-1960680 | A | 3/2019 |
| KR | 10-2014196 | A | 8/2019 |
| KR | 10-2019-0115962 | A | 10/2019 |

* cited by examiner

ELECTRONIC DEVICE FOR STORING EXTERNAL ELECTRONIC DEVICE

CROSS-REFERENCE TO RELATED APPLICATION(S)

This application is a continuation of International Application No. PCT/KR2021/000786, filed on Jan. 20, 2021, which claims priority to Korean Patent Application No. 10-2020-0012744, filed on Feb. 3, 2020, in the Korean Intellectual Property Office, the disclosure of which are incorporated by reference herein their entirety.

BACKGROUND

Technical Field

The disclosure relates to an electronic device for storing an external electronic device, and more particularly to an electronic device (e.g., a charging case) for housing at least audio output device (e.g., an earbud or an in-ear headphone) when not in use.

Description of Related Art

A wireless sound output device (e.g., earbuds) is configured to receive audio data from an electronic device such as a smartphone through wireless communication. The wireless sound output device may be provided with a battery for providing necessary power since it does not include a cable for electrical connection. In addition, the wireless sound output device may be easily lost while not in use due to its relatively small size.

To solve this problem, the wireless sound output device may be stored in a separate electronic device to prevent loss while not in use, and charging of the battery may be possible in the state in which the wireless sound output device is stored in the electronic device. For example, the wireless sound output device may be stored by being inserted at least partially in a recess provided in the electronic device, and charging may be performed by bringing a conductive pin provided in the recess into contact with a conductive pin of the wireless sound output device.

As the recess of the electronic device is provided deeper and a portion of the wireless sound output device to be inserted into the recess increases, the wireless sound output device may be stably stored in the recess of the electronic device.

Magnets may be used to stably store the wireless sound output device in the recess of the electronic device while maintaining electrical contact for charging. For example, by disposing at least one magnet in each of the wireless sound output device and the electronic device, and implementing the magnets, at least one of which is disposed in each of the wireless sound device and the electronic device, to attract each other, the wireless sound output device may be more firmly seated in the recess and the electrical contact between the electronic device and the wireless sound output device may be stably maintained.

As the portion of the wireless sound output device inserted into the recess increases, the portion exposed to the exterior may decrease. It may be difficult for a user to hold a portion of the wireless sound output device exposed to the exterior with a finger, and it may be difficult to take out the wireless sound output device from the recess.

As the magnetic property for maintaining the electrical contact between the electronic device and the wireless sound output device is stronger, the wireless sound output device is seated more strongly in the recess, so it may be difficult for a user to take out the wireless sound output device from the recess.

The foregoing section of this document introduces information about and/or from the art that may provide context for or be related to the subject matter described herein and/or claimed below. It provides background information to facilitate a better understanding of the certain aspects of the that which is claimed below. This is a discussion of "related" art. That such art is related in no way implies that it is also "prior" art. The related art may or may not be prior art. The discussion in this section of this document is to be read in this light, and not as admissions of prior art.

The foregoing section of this document introduces information about and/or from the art that may provide context for or be related to the subject matter described herein and/or claimed below. It provides background information to facilitate a better understanding of the certain aspects of the that which is claimed below. This is a discussion of "related" art. That such art is related in no way implies that it is also "prior" art. The related art may or may not be prior art. The discussion in this section of this document is to be read in this light, and not as admissions of prior art.

SUMMARY

An electronic device according to an embodiment may include: a structure that is configured to weaken a magnetic force acting between an external electronic device (e.g., a wireless sound output device, for example an earbud) and the electronic device (for example, the charging case for the earbud). As a result, removal of the external electronic device from the electronic device may be facilitated.

An electronic device according to an embodiment may be configured to facilitate separation of an external electronic device (e.g., an earbud) from the electronic device (e.g., a charging case) by changing the direction of a magnetic force acting between the external electronic device and the electronic device.

In an embodiment, an electronic device for accommodating at least one earbud may include: a housing configured to accommodate a first portion of a bracket, the bracket defining a second portion having seating space in which the at least one earbud is at least partially accommodated; and a cover rotatably connected to the housing and configured to cover the second portion of the bracket, wherein a third portion of the bracket is exposed to an exterior of the housing while covering an edge portion of the housing, the third portion includes at least one protrusion that protrudes inward toward the edge of the housing, the edge portion of the housing includes at least one groove, which corresponds to the at least one protrusion and provides a space in which the at least one protrusion is movable, and the bracket transitions between a first position and a second position depending on positions of the at least one groove and the at least one protrusion.

In an embodiment, an electronic device for accommodating at least one earbud may include: a housing configured to provide at least one recess in which at least a portion of the at least one earbud is accommodated, wherein the housing includes an opening providing a space through which a magnetic switch is movable; the magnetic switch disposed within the housing and including a first magnet, wherein the magnetic switch passes through the opening such that a portion of the magnetic switch is exposed to exterior of the housing; and a cover rotatably coupled to the housing and configured to cover a space defined by the at least one recess, wherein the first magnet overlaps a second magnet included in the at least one earbud in a state in which the at least one earbud is accommodated in the at least one recess, and the magnetic switch may be configured to transition between a first position and a second position through the opening such that the first magnet and the second magnet define an overlapping region that varies as the magnetic switch transitions between the first position and the second position and therebetween.

According to an embodiment, a case for accommodating a wireless sound output device may include: a housing configured to provide a recess in which at least a portion of the wireless sound output device is accommodated, wherein the housing includes a first opening and a second opening aligned with the first opening and provided in the recess; and a pop-up switch passing through the first opening and disposed within the housing to be aligned with the second opening, the pop-up switch being actuatable to transition between a first state in which the pop-up switch is in a first position relative to a length of the second opening and a second state in which the pop-up switch is in a second position relative to the length of the second opening, wherein the pop-up switch protrudes into the recess through the second opening in response to a user input such that the pop-up switch transitions from the first state to the second state, wherein in the second state at least a portion of the wireless sound output device pops up out of the recess.

These and other aspects of the disclosure are described hereinbelow with reference to the accompanying drawings.

BRIEF DESCRIPTION OF THE DRAWINGS

FIG. 1A is a perspective view of an electronic device 100 according to an embodiment when the electronic device is viewed from one direction in the state in which a cover 120 is opened.

FIG. 1B is a perspective view of the electronic device 100 according to an embodiment when the electronic device is viewed from another direction different from that in FIG. 1A in the state in which the cover 120 is opened.

Referring to FIGS. 1A and 1B, the electronic device 100 according to an embodiment may include a housing 110, a connection portion 140, and a cover 120.

Figure 1A:
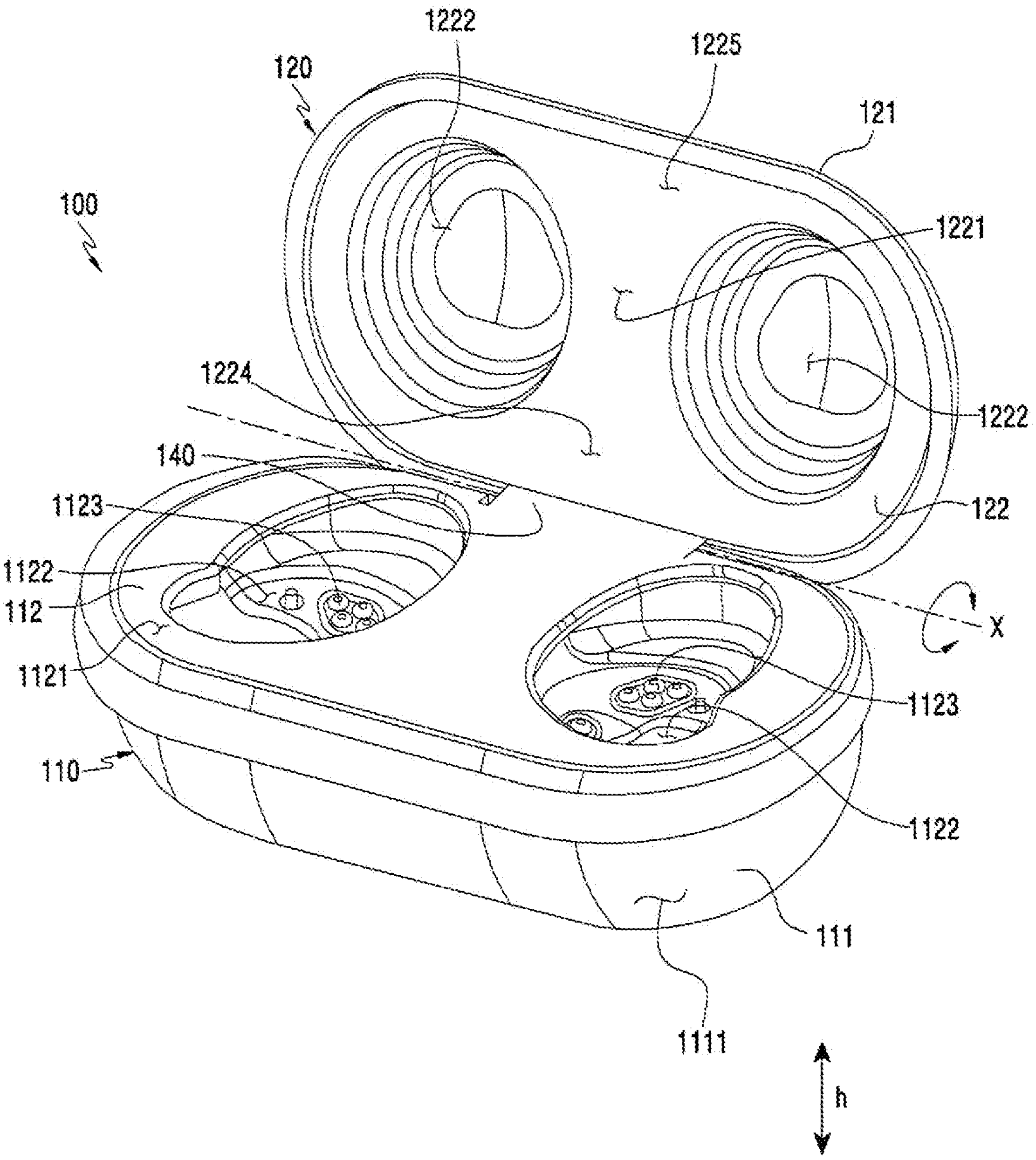
FIG. 1A is a perspective view of an electronic device according to an embodiment when the electronic device is viewed from one direction in the state in which a cover is opened.

The housing 110 according to an embodiment may include a body 111 having a predetermined shape and a bracket 112 coupled to the body 111.

In an embodiment, the bracket 112 may be coupled to the body 111. The bracket 112 may be coupled to the body 111 to cover at least a portion of an outer surface 1111 of the body 111. In an embodiment, the bracket 112 may be coupled to the body 111 to be transitionable or movable in the height direction h of the housing 110. In order for the bracket 112 to be movable in the height direction h of the housing 110, the bracket 112 may include at least one protrusion (e.g., the at least one protrusion 312 in FIG. 3) and the body 111 may include at least one groove (e.g., the at least one groove 311 in FIG. 3) corresponding to the at least one protrusion.

In an embodiment, a top surface of the casing 1121 of the bracket 112 may be exposed to the exterior when the cover 120 in the open state.

Figure 2A:
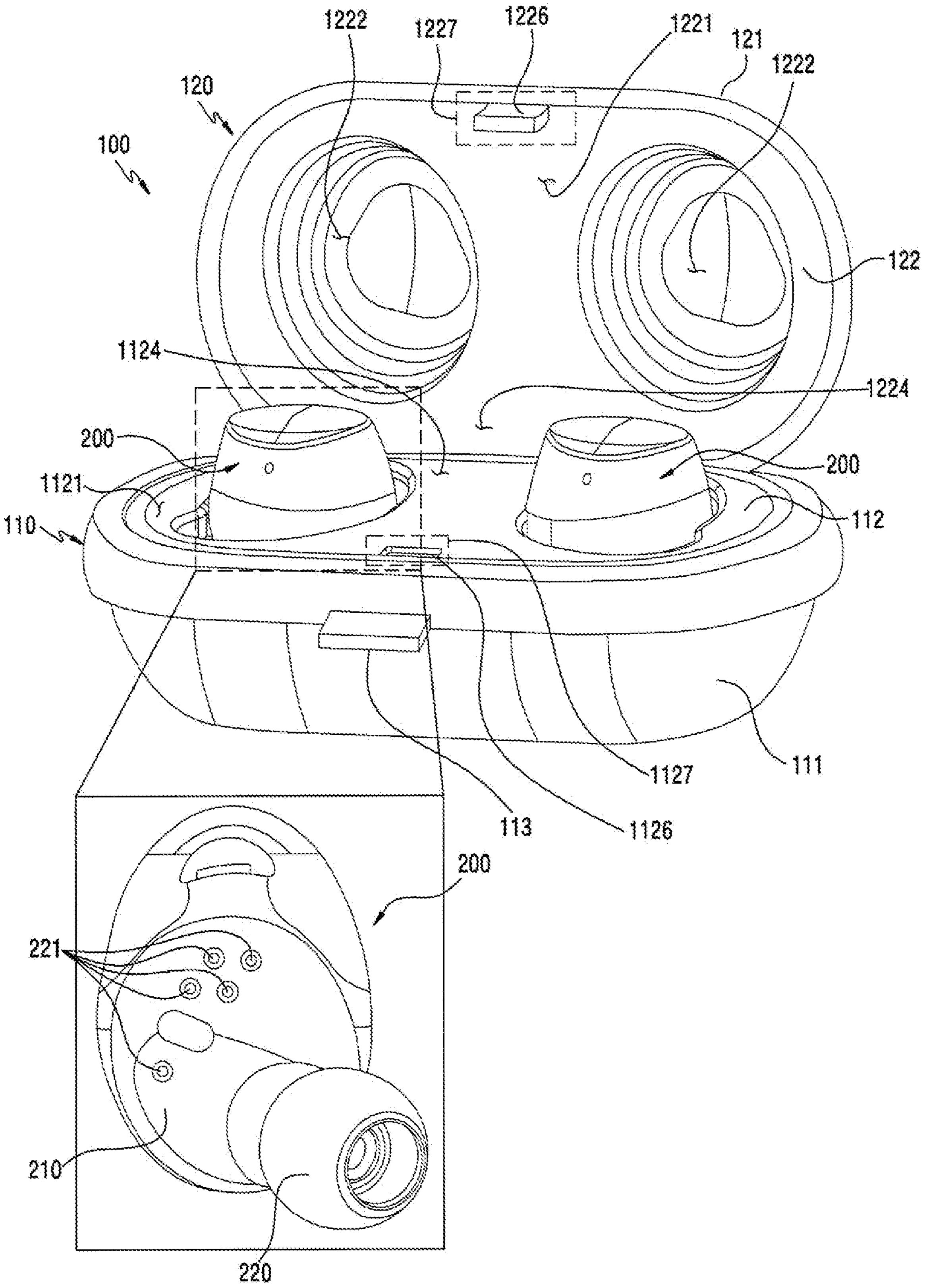
FIG. 2A illustrates the electronic device according to an embodiment in the state in which an external electronic device is accommodated and the cover is opened.

According to an embodiment, the housing 110 may include at least one recess 1122 provided on the top surface of the casing 1121 of the bracket 112 and configured to accommodate at least a portion of an external electronic device (e.g., the external electronic device 200 in FIG. 2A).

According to an embodiment, the cover 120 may be coupled to the housing 110 to be capable of being opened and closed in a predetermined angle by the connection portion 140.

In an embodiment, the cover 120 may include an upper cover 121 and a lower cover 122 including a facing surface 1221 configured to face the top surface of the casing 1121 of the housing 110. In another embodiment, the upper cover 121 and the lower cover 122 of the cover 120 may be integrally configured.

In an embodiment, the lower cover 122 may include an accommodation groove 1222 corresponding to the recess 1122 of the bracket 112. In an embodiment, the accommodation groove 1222 may overlap the recess 1122 in the state in which the cover 120 is closed. In an embodiment, the accommodation groove 1222 may have a depth capable of accommodating a portion of the external electronic device that protrudes from the housing 110 in the state in which the external electronic device is accommodated in the recess 1122 of the housing 110.

According to an embodiment, the connection portion 140 may couple the housing 110 and the cover 120 to be rotatable about the illustrated X axis. For example, the connection portion 140 may be coupled to the body 111 of the housing 110 so as not to interfere with the moving operation of the bracket 112, and the body 111 and the cover 120 may be rotatable about the connection portion 140. In an embodiment, the connection portion 140 may include a hinge structure. In another embodiment, the connection portion 140 may be configured integrally with the body 111 or the cover 120.

The electronic device 100 according to an embodiment may include at least one conductive pin 1123 disposed in the recess 1122 of the housing 110. In an embodiment, at least a portion of the at least one conductive pin 1123 may protrude from the housing 110. In an embodiment, the at least one conductive pin 1123 may be disposed to face an external electronic device (e.g., the external electronic device 200 in FIG. 1D) accommodated in the recess 1122. The electronic device 100 according to an embodiment may be electrically coupled or connected to the external electronic device via the at least one conductive pin 1123. In an embodiment, the at least one conductive pin 1123 may include a detect pin that is configured to detect the mounting of the external electronic device (e.g., the external electronic device 200 of FIG. 2A), a charging pin, a data communication pin, or a ground (GND) pin, but may alternatively include a different number or different types of pins. In an embodiment, the at least one conductive pin 1123 may include a pogo pin and/or an elastic C-clip, for example.

Figure 1B:
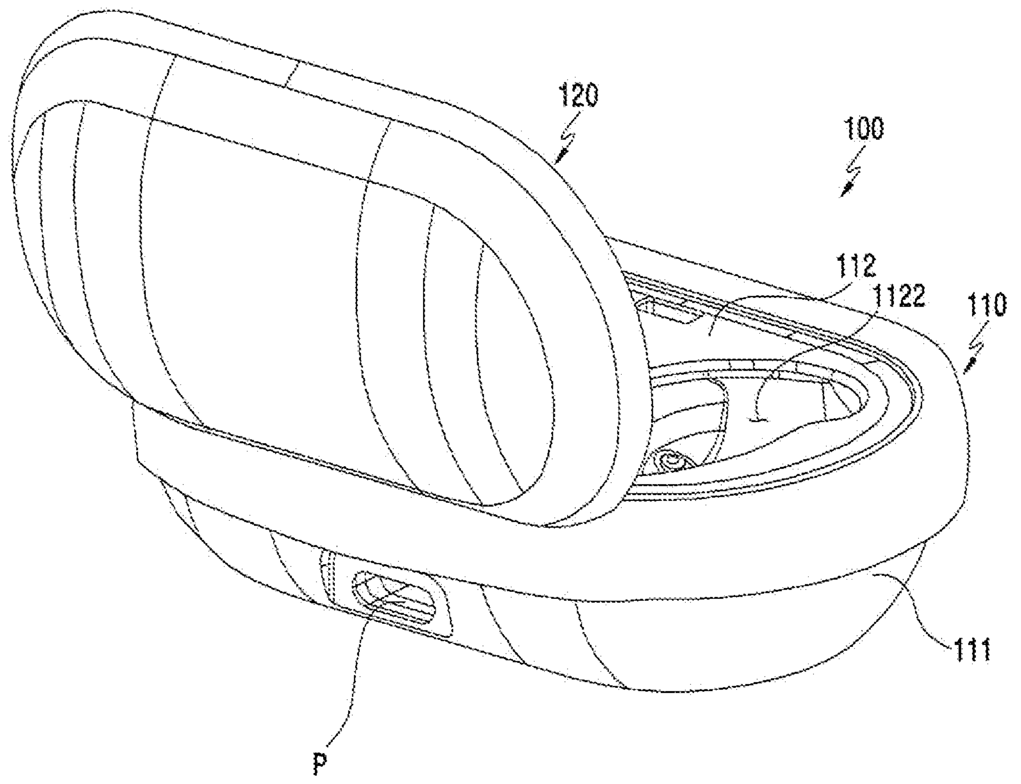
FIG. 1B is a perspective view of the electronic device according to an embodiment when the electronic device is viewed from another direction that is different from that in FIG. 1A in the state in which the cover is opened.

Referring to FIG. 1B, the electronic device 100 according to an embodiment may include a connector port P disposed in the housing 110. According to an embodiment, by being electrically connected to a connector of an external power supply, the connector port P may be used for charging the electronic device (e.g., the electronic device 200 in FIG. 2A) accommodated in the recess 1122 via the conductive pin 1123. However, the disclosure is not limited thereto, and the connector port P may be used for data communication between the external electronic device (e.g., the external electronic device 200 of FIG. 2A) accommodated in the recess 1122 and another external electronic device. In another embodiment, the connector port P may be omitted from the electronic device 100. For example, the electronic device 100 may support wireless charging and wireless communication connection (e.g., BT) to replace the function of the connector port P.

FIG. 2A illustrates the electronic device 100 according to an embodiment in the state in which an external electronic device 200 is accommodated and the cover 120 is opened.

Figure 2B:
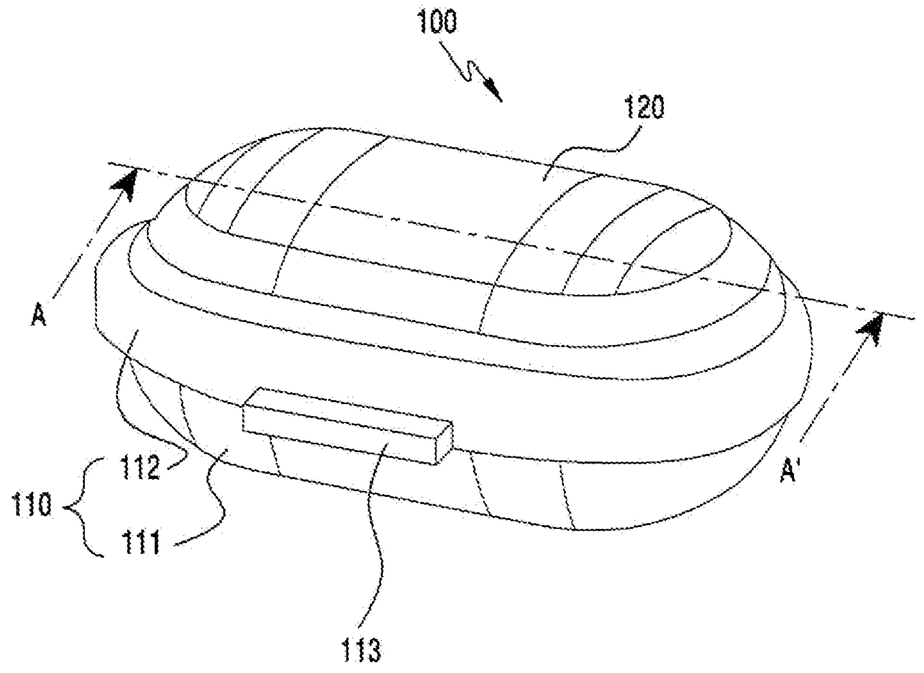
FIG. 2B illustrates the electronic device according to an embodiment in the state in which an external electronic device is accommodated and the cover is closed.

FIG. 2B illustrates the electronic device 100 according to an embodiment in the state in which the external electronic device 200 is accommodated and the cover 120 is closed.

Referring to FIGS. 2A and 2B, the external electronic device 200 (e.g., earbuds) may be accommodated in a recess 1122 that is provided in the housing 110. For example, the external electronic device 200 may be accommodated in a manner of being at least partially seated in the recess 1122 of the electronic device 100.

In an embodiment, the external electronic device 200 may include a body 210 and an earpiece 220 disposed on at least one region of the body 210.

In an embodiment, the external electronic device 200 may include at least one conductive connector 221 (e.g., a conductive terminal) disposed on the body 210. The at least one conductive connector 221 may be disposed to correspond to the at least one conductive pin 1123 of the electronic device 100. For example, the at least one conductive connector 221 of the external electronic device 200 may be disposed to contact the at least one conductive pin 1123 of the electronic device 100 in the state in which the external electronic device 200 is accommodated in the housing 110. In an embodiment, when the external electronic device 200 is accommodated in the housing 110 and the cover 120 is closed, the at least one conductive connector 221 receives a pressure acting toward the at least one conductive connector 221 by the cover 120 so that the at least one conductive connector 221 and the at least one conductive pin 1123 configured to maintain a physical contact state therebetween.

In an embodiment, the top surface of the casing 1121 of the bracket 112 and a portion of the external electronic device 200 may be visible from the exterior in the state in which the cover 120 is opened.

In an embodiment, the cover 120 may cover the housing 110 such that the top surface of the casing 1121 of the bracket 112 and the external electronic device 200 are not visible from the exterior.

In an embodiment, each of the recess 1122 of the housing 110 and the accommodation groove 1222 of the cover 120 are not limited to any one embodiment in shape and/or size, and may have a suitable shape and/or size to accommodate the external electronic device 200.

In an embodiment, the electronic device 100 may include a configuration necessary to maintain the housing 110 and the cover 120 in the fully closed state.

For example, the electronic device 100 may include a locking protrusion 1226 disposed on the cover 120, and the housing 110 may include a locking groove 1126 corresponding to the locking protrusion 1226. Since the locking protrusion 1226 and the locking groove 1126 may be engaged with each other, the electronic device 100 according to an embodiment may maintain the housing 110 and the cover 120 in the fully closed state.

As another example, the electronic device 100 may include a cover magnet 1227 disposed in the cover 120 and a housing magnet 1127 disposed at a position corresponding to the cover magnet 1227 in the housing 110. Since the cover magnet 1227 and the housing magnet 1127, which are disposed to face each other with opposite polarities, attract each other, the electronic device 100 according to an embodiment is configured to maintain the state in which the housing 110 and the cover 120 are fully closed.

In an embodiment, the bracket 112 may be provided with a protrusion 113 on one side thereof. The protrusion 113 may have a size suitable to be held with a user's finger.

Figure 3:
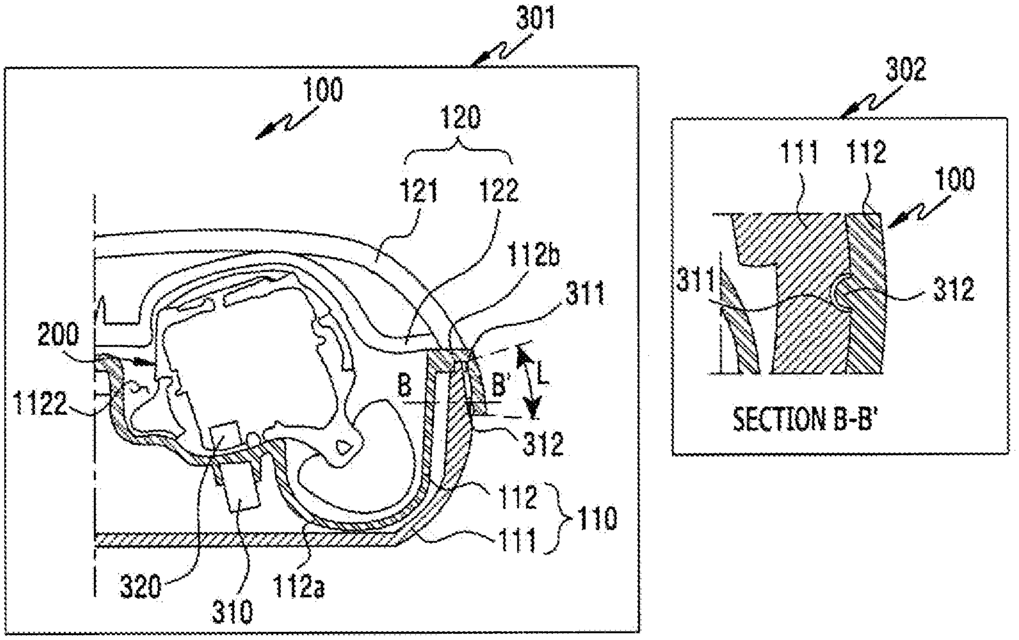
FIG. 3 is a cross-sectional view of the electronic device according to an embodiment in the state in which an external electronic device is accommodated.

FIG. 3 is a cross-sectional view of the electronic device 100 according to an embodiment in the state in which the external electronic device 200 is accommodated.

Reference numeral 301 of FIG. 3 is an A-A' cross-sectional view of the electronic device 100 illustrated in FIG. 2B, and reference numeral 302 of FIG. 3 is a B-B' cross-sectional view of the electronic device 100 illustrated in FIG. 3.

Referring to FIG. 3, the electronic device 100 according to an embodiment may include a first magnet 310.

In an embodiment, the first magnet 310 may be disposed inside the housing 110. For example, the first magnet 310 may be disposed between the body 111 and the bracket 112 of the housing 110.

In an embodiment, in the state in which the external electronic device 200 is accommodated in the electronic device 100, the first magnet 310 may be placed to overlap a second magnet 320 of the external electronic device 200. In an embodiment, in the state in which the external electronic device 200 is accommodated in the electronic device 100, an attractive force may act between the first magnet 310 and the second magnet 320, and the external electronic device 200 may be pulled toward the recess 1122 of the electronic device 100.

In an embodiment, a portion of the bracket 112 may be accommodated in the body 111, and a portion of the bracket 112 that is not accommodated in the body 111 may be exposed to the exterior while covering the rim of the body 111. For example, a first portion 112*a* of the bracket 112 may be accommodated in the body 111, and a second portion 112*b* of the bracket 112 may extend from the first portion 112*a* while covering a portion of the edge of the body 111. The second portion 112*b* of the bracket 112 may be visible from the exterior, and a portion of the edge of the body 111 surrounded by the second portion 112*b* may not be visible from the exterior. In an embodiment, since the second portion 112*b* of the bracket 112 covers a portion of the body 111, a step may be formed on the side surface 1111 of the housing 110.

In an embodiment, the bracket 112 may include at least one protrusion 312 provided in the second portion 112*b*. At least one protrusion 312 may protrude from the second portion 112*b* of the bracket 112 toward the body 111.

In an embodiment, the body 111 may include at least at least one groove 311 corresponding to the at least one protrusion 312. In the state in which the bracket 112 and the body 111 are coupled to each other, the at least one protrusion 312 may be accommodated in the at least one groove 311.

In an embodiment, the at least one groove 311 may provide a space in which the at least one protrusion 312 is movable. For example, the at least one groove 311 may extend by a predetermined length L along the circumference of the body 111 in the height direction, and the at least one protrusion 312 may move along the at least one groove 311.

In an embodiment, the bracket 112 may move from the body 111 depending on the position of the at least one groove 311.

In an embodiment, by the attractive force acting between the first magnet 310 and the second magnet 320, the external electronic device 200 may be firmly stored in the recess 1122 of the electronic device 100, and the at least one conductive connector 221 of the external electronic device 200 and the at least one conductive pin 1221 of the electronic device 100 may maintain a physical contact state therebetween. The first magnet 310 and the second magnet 320 may be determined to have an attractive force strong enough to fix the external electronic device 200 in the recess 1122.

During use, for example, the user of the electronic device 100 may hold the external electronic device 100 with a finger of the user in the state in which the cover 120 is opened, and may take out the external electronic device 200 from the recess 1122. The user of the electronic device 200 may take out the external electronic device 200 by applying a force stronger than the attractive force.

In an embodiment, as the attractive force acting between the electronic device 100 and the external electronic device 200 (e.g., the attractive force acting between the first magnet 310 and the second magnet 320) is stronger, the external electronic device 200 may be more strongly fixed in the recess 1122 of the electronic device 100. In addition, the reliability of the electrical connection between the electronic device 100 and the external electronic device 200 may be improved. In contrast, as the attractive force between the electronic device 100 and the external electronic device 200 is stronger, it may be difficult for the user of the electronic device 100 to take out the external electronic device 200 from the electronic device 100.

Figure 4:
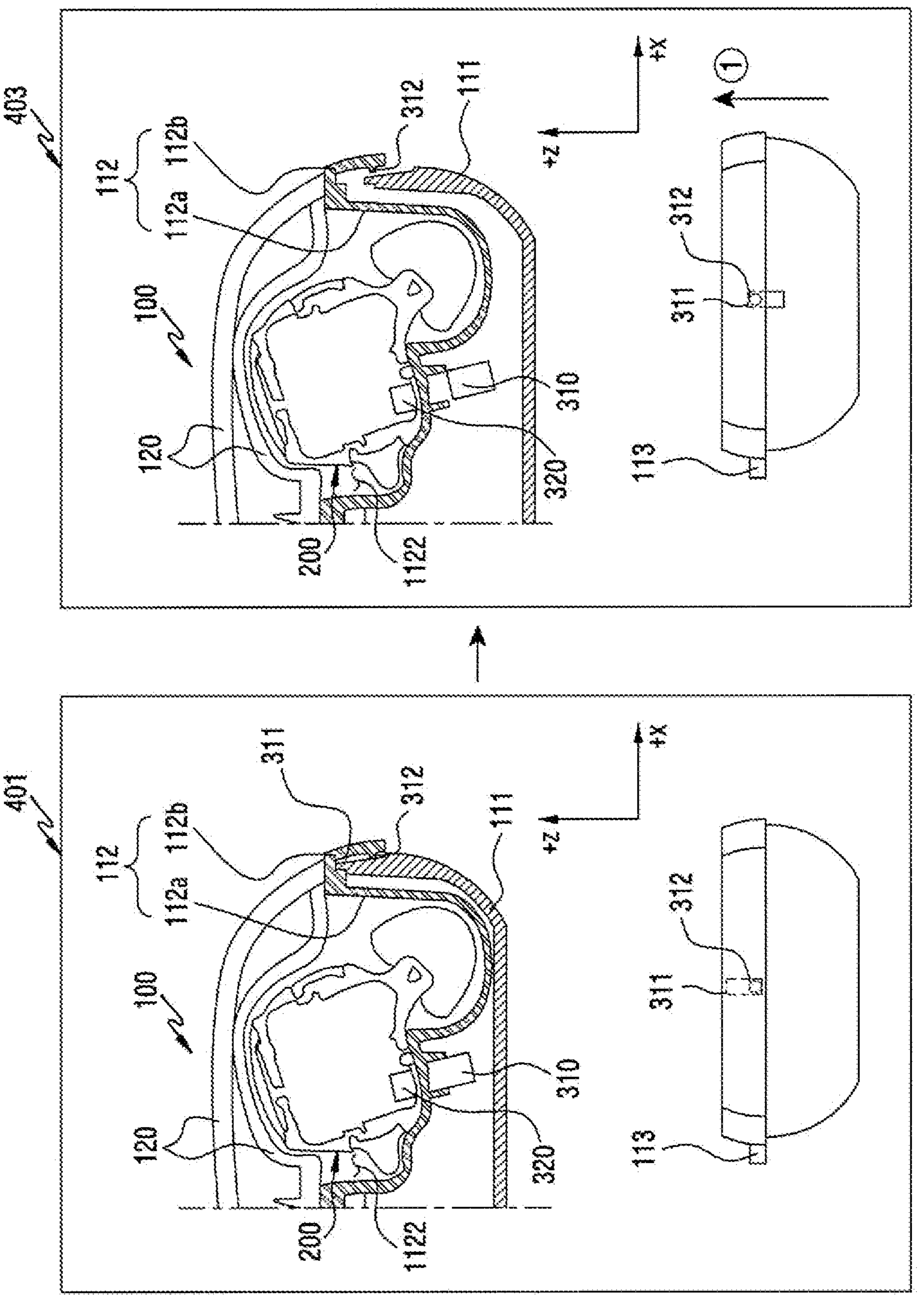
FIG. 4 is a view illustrating an operation in which the bracket of the electronic device illustrated in FIG. 3 is moved relative to the housing of the electronic device.

FIG. 4 is a view illustrating an operation in which the bracket 112 of the electronic device 100 illustrated in FIG. 3 moves.

Referring to FIG. 4, the bracket 112 including the at least one protrusion 312 is movable along the at least one groove 311. For example, the bracket 112 is movable in a direction in which the at least one groove 311 extends (e.g., the +z-direction or the direction of directional arrow ①).

In an embodiment, since the external electronic device 200 is accommodated in the recess 1122 of the bracket 112, the distance between the first magnet 310 of the electronic device 100 and the second magnet 320 of the external electronic device 200 may vary depending on the movement of the bracket 112. For example, as the bracket 112 moves in the direction of directional arrow ①), the first magnet 310 and the second magnet 320 may move away from each other.

In an embodiment, the attractive force that attracts the external electronic device 200 toward the recess 1122 of the electronic device 100 may vary depending on the distance between the first magnet 310 and the second magnet 320. For example, as the first magnet 310 and the second magnet 320 move away from each other, the attractive force acting between the external electronic device 200 and the electronic device 100 may decrease. When the attractive force decreases, the user of the electronic device 100 may easily take out the external electronic device 200 from the recess 1122.

In an embodiment, the position of the bracket 112 may be changed when the user directly applies an external force to the bracket 112. In an embodiment, the bracket 112 may include a protrusion 113 for the user to conveniently move the bracket 112. The user may the protrusion 113 with a finger and push up the bracket 112.

Referring to reference numeral 401, the bracket 112 may be in the first position. When the bracket 112 is located at the first position, the distance between the bracket 112 and the first magnet 310 may be a first distance.

Referring to reference numeral 403, the bracket 112 may be in the second position. The bracket 112 may be spaced farther away from the body 111 when it is located at the second position than when it is located at the first position. When the bracket 112 is located at the second position, the distance between the bracket 112 and the first magnet 310 may be a second distance greater than the first distance. In an embodiment, when the bracket 112 is located at the second position, the distance and attractive force between the first magnet 310 and the second magnet 320 may be smaller than that when the bracket 112 is located at the first position.

In an embodiment, the bracket 112 is movable between the first position and the second position depending on the positions of the at least one groove 311 and the at least one protrusion 312.

In an embodiment, the cover 120 may be rotated in response to the movement of the bracket 112 from the first position to the second position, and the cover 120 may remain closed or may be fully opened in response to the movement of the bracket 112. For example, as illustrated by reference numeral 403 of FIG. 4, the cover 120 is rotated along the direction indicated by directional arrow ① by the flow of the bracket 112, but may be maintained in a closed state. As another example, unlike the illustrated state, the cover 120 may be rotated in the direction indicated by directional arrow ① and fully opened by the movement of the bracket 112. The electronic device 100 according to an embodiment may include a configuration that enables the cover 120 to be automatically opened when the cover 120 is rotated by the bracket 112 by a predetermined angle or more. For example, the configuration may include a torsion spring coupled to the connecting portion (e.g., the connecting portion 140 of FIG. 1A), but is not limited thereto, and various mechanisms available by those skilled in the art may be applied.

Figure 5:
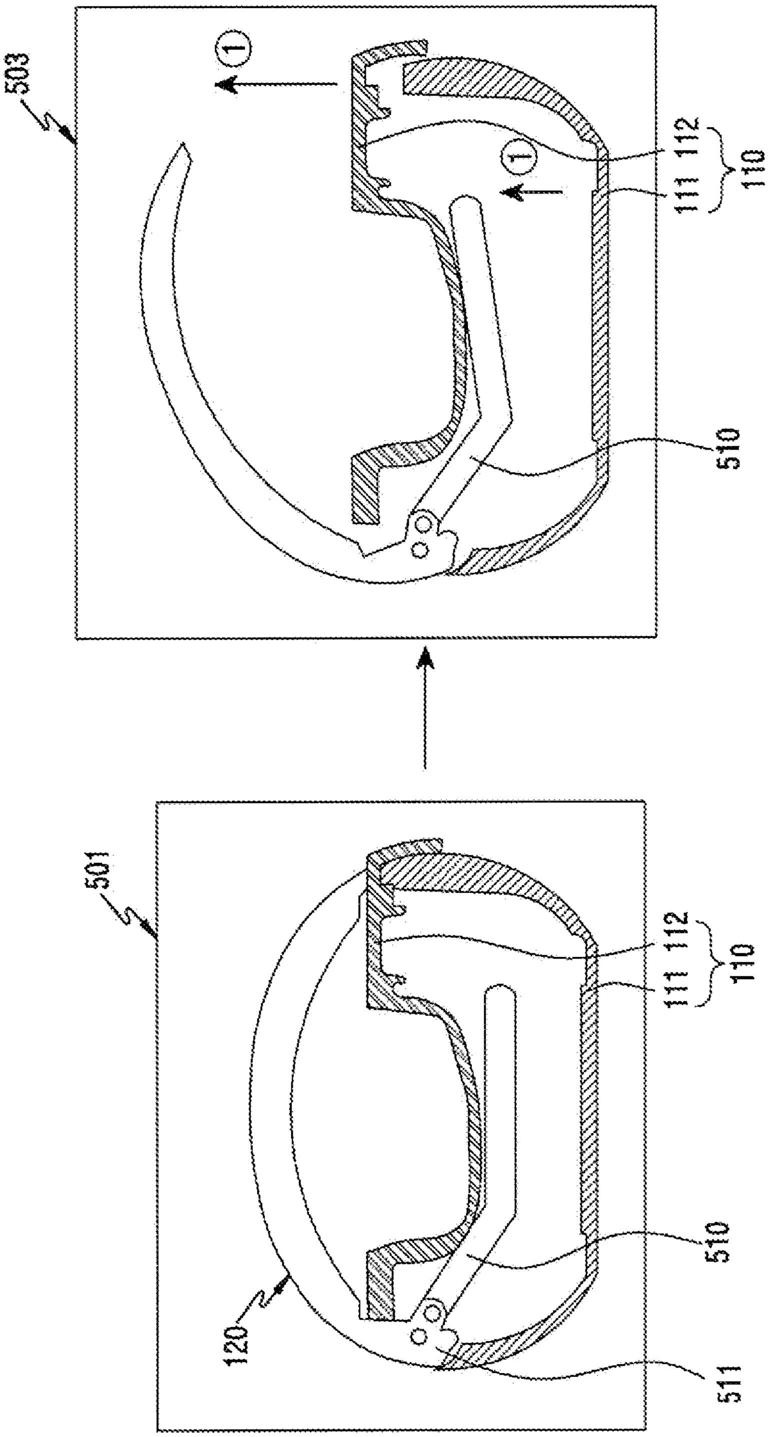
FIG. 5 is a cross-sectional view of a main portion of an electronic device including a link member according to an embodiment.

FIG. 5 is a cross-sectional view of a main portion of an electronic device 100 including a link member 510 according to an embodiment.

Referring to FIG. 5, the electronic device 100 according to an embodiment may include a link member 510.

In an embodiment, the link member 510 may be coupled to the cover 120, and may extend from a coupling portion 511 of the cover 120 to the interior of the housing 110 by a predetermined length. The link member 510 may include a bent portion in one region, but is not limited thereto. For example, the link member 510 may be configured in a bar type in which no bent portion is provided.

In an embodiment, the link member 510 may move in response to the opening/closing operation of the cover 120. For example, when the cover 120 is opened, the coupling portion 511 of the cover 120 may be rotated at an angle corresponding to the rotation angle of the cover 120, and the link member 510 connected to the coupling portion 511 may be moved in the direction indicated by directional arrow ① in response to the rotation of the coupling portion 511.

In an embodiment, the bracket 112 may be moved in response to the operation of the link member 510. For example, the link member 510 may be moved in response to the operation of the cover 120, and the bracket 112 may be moved in the direction indicated by directional arrow while being pushed up by the link member 510.

In an embodiment, when the cover 120 is in the closed state (501), the bracket 112 may be located at the first position, and when the cover 120 is in the fully opened state (503), the bracket 112 may be located at the second position moved in the direction indicated by directional arrow ① from the first position. In an embodiment, the cover 120 is movable between the closed state (501) and the fully opened state (503). The link member 510 is movable to correspond to the opened angle of the cover 120. The bracket 112 is movable between the first position and the second position in response to the movement of the cover 120 and the link member 510.

In an embodiment, as described above with reference to FIG. 4, when the bracket 112 is located at the first position, the distance between the bracket 112 and the first magnet 310 of the electronic device 100 may be the first distance, and when the bracket 112 is located at the second position, the distance between the bracket 112 and the first magnet 310 may be the second distance greater than the first distance. In an embodiment, when the bracket 112 is located at the second position, the distance and attractive force between the first magnet 310 of the electronic device 100 and the second magnet 320 of the external electronic device 200 may be smaller than that when the bracket 112 is located the first position.

The electronic device 100 according to an embodiment may firmly store the external electronic device 200 in the recess 1122 in the state in which the cover 120 is closed (501), and may allow the user of the electronic device 100 to easily take out the cover 120 when the cover is in the fully opened state (503).

In an embodiment, the user of the electronic device 100 may move the bracket 112 only with the operation of opening/closing the cover 120 without applying an external force directly to the bracket 112, unlike the example illustrated in FIG. 4. Since the bracket 112 is movable in response to the operation of the link member 510 cooperating with the cover 120 rather than an external force directly applied from the user, the protrusion 113 for allowing the user to easily move the bracket 112 may not be provided.

Figure 6:
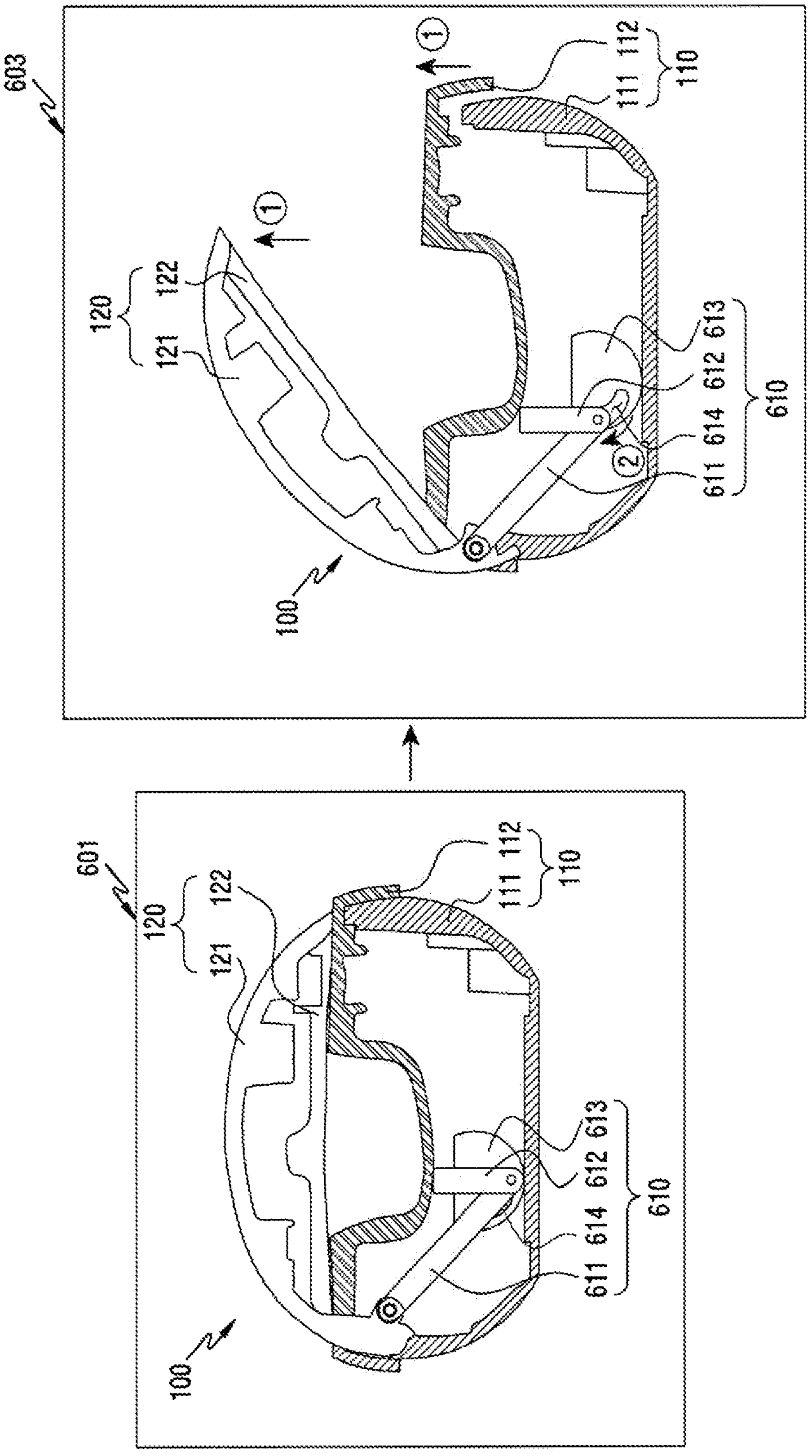
FIG. 6 is a cross-sectional view of an electronic device including a link member according to an embodiment.

In an embodiment, the link member 510 may be replaced with the link member 610 of FIG. 6.

The description provided with reference to FIGS. 1 to 4 is equally applicable to the electronic device 100 illustrated in FIG. 6 in the same manner, except that the electronic device 100 illustrated in FIG. 6 further includes a link member 610.

FIG. 6 is a cross-sectional view of an electronic device 100 including a link member 610 according to an embodiment.

Referring to FIG. 6, the electronic device 100 according to an embodiment may include a link member 610.

In an embodiment, the link member 610 may include a first member 611, a second member 612, and a third member 613. One end of the first member 611 may be coupled to the cover 120, and the other end of the first member 611 may be coupled to the second member 612. One end of the second member 612 may be coupled to the first member 611, and the other end of the second member 612 may come into contact with the bracket 112. The first member 611 or the second member 612 may pass through a guide hole 614 provided in the third member 613.

In an embodiment, the link member 610 is movable in response to the opening/closing operation of the cover 120, and the bracket 112 is movable in response to the operation of the link member 610. For example, when the cover 120 is changed from the closed state (601) to the open state (603), the bracket 112 is movable from the first position to the second position. For example, while the cover 120 is opened, the first member 611 connected to the cover 120 is movable along the guide hole 614 in the third member 613 (e.g., in the direction indicated by directional arrow ②), and the second member 612 connected to the first member 611 is movable toward the bracket 112 (e.g., e.g., in the direction indicated by directional ①) in response to the operation of the first member 612. The third member 613, which is in contact with the bracket 112, may push up the bracket 112 in the direction indicated by directional arrow ① in response to the opening operation of the cover 120.

In an embodiment, the link member 610 and the bracket 112 are movable between the first position and the second position. As described above with reference to FIG. 4, when the bracket 112 is located at the first position, the distance between the bracket 112 and the first magnet 310 of the electronic device 100 may be the first distance, and when the bracket 112 is located at the second position, the distance between the bracket 112 and the first magnet 310 may be the second distance greater than the first distance. In an embodiment, when the bracket 112 is located at the second position, the distance and attractive force between the first magnet 310 of the electronic device 100 and the second magnet 320 of the external electronic device 200 may be smaller than that when the bracket 112 is located the first position.

The description provided with reference to FIG. 5 is applicable to the electronic device 100 illustrated in FIG. 6 in the same manner, except that the link member 510 of FIG. 5 is replaced with the link member 610.

Figure 7:
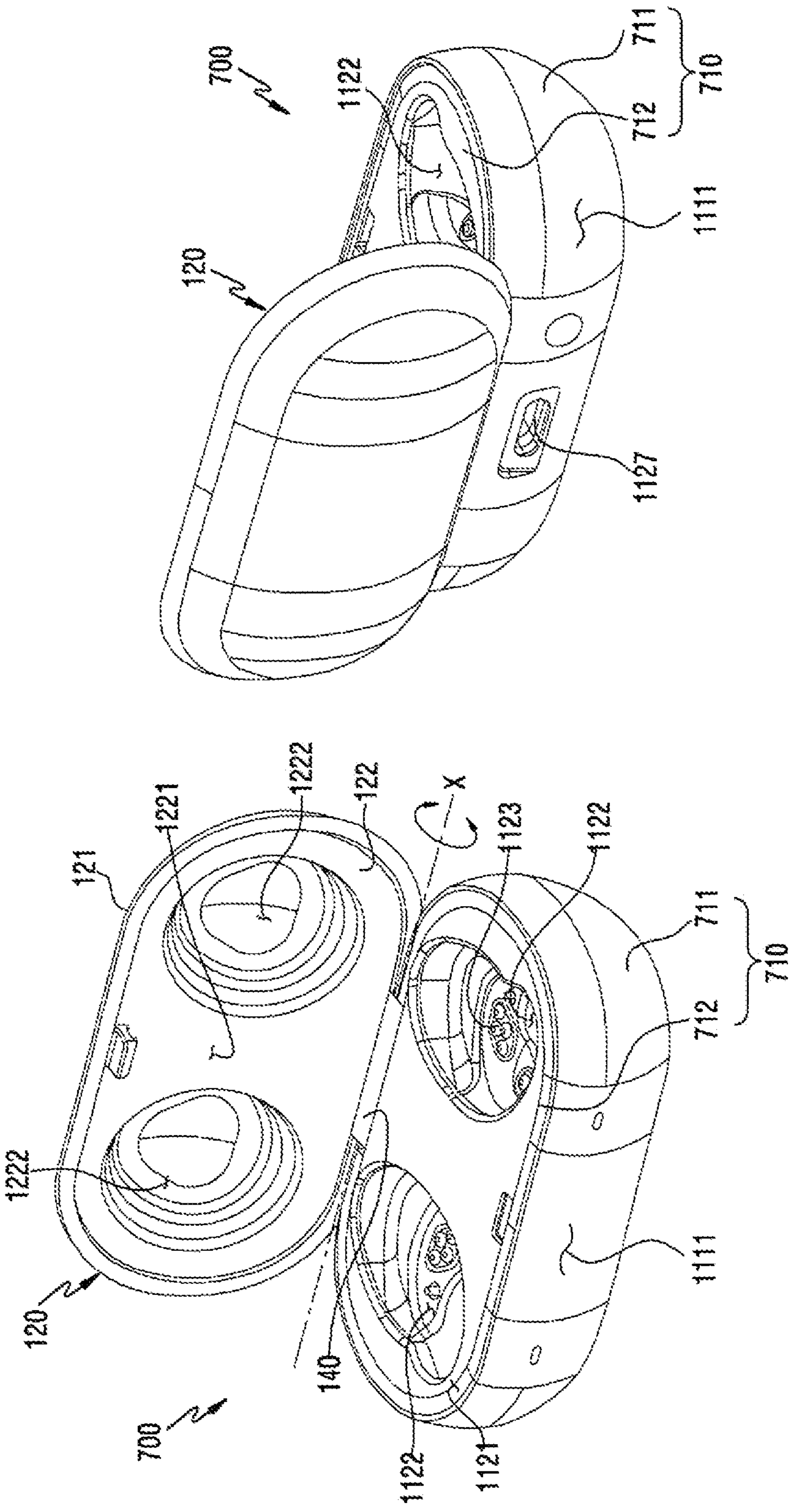
FIG. 7 illustrates an electronic device according to another embodiment.

FIG. 7 illustrates an electronic device 700 according to another embodiment.

The description provided with reference to FIGS. 1A, 1B, 2A, and 2B may be applicable to the components of the electronic device 700 of FIG. 7 having the same reference numerals as those of FIG. 1 in the same or corresponding manner.

Referring to FIG. 7, the electronic device 700 according to an embodiment may include a housing 710.

In an embodiment, the housing 710 may include a body 711 and a bracket 712. The body 711 may define a side surface 1111 of the housing 110, and the bracket 712 may define a top surface of the casing 1121 of the housing 110.

In an embodiment, at least a portion of the bracket 712 may be accommodated in the space defined by the body 711.

Unlike the electronic device 100 of FIG. 1, the bracket 712 of the electronic device 700 illustrated in FIG. 7 does not cover a portion of the side surface 1111 of the body 711, so no step may be provided on the side surface 1111 of the housing 710.

Since the electronic device 700 according to an embodiment does not include the at least one protrusion 312 and the at least one groove 311 illustrated in FIG. 3, the bracket 712 may not be movable unlike the bracket 112.

Figure 8A:
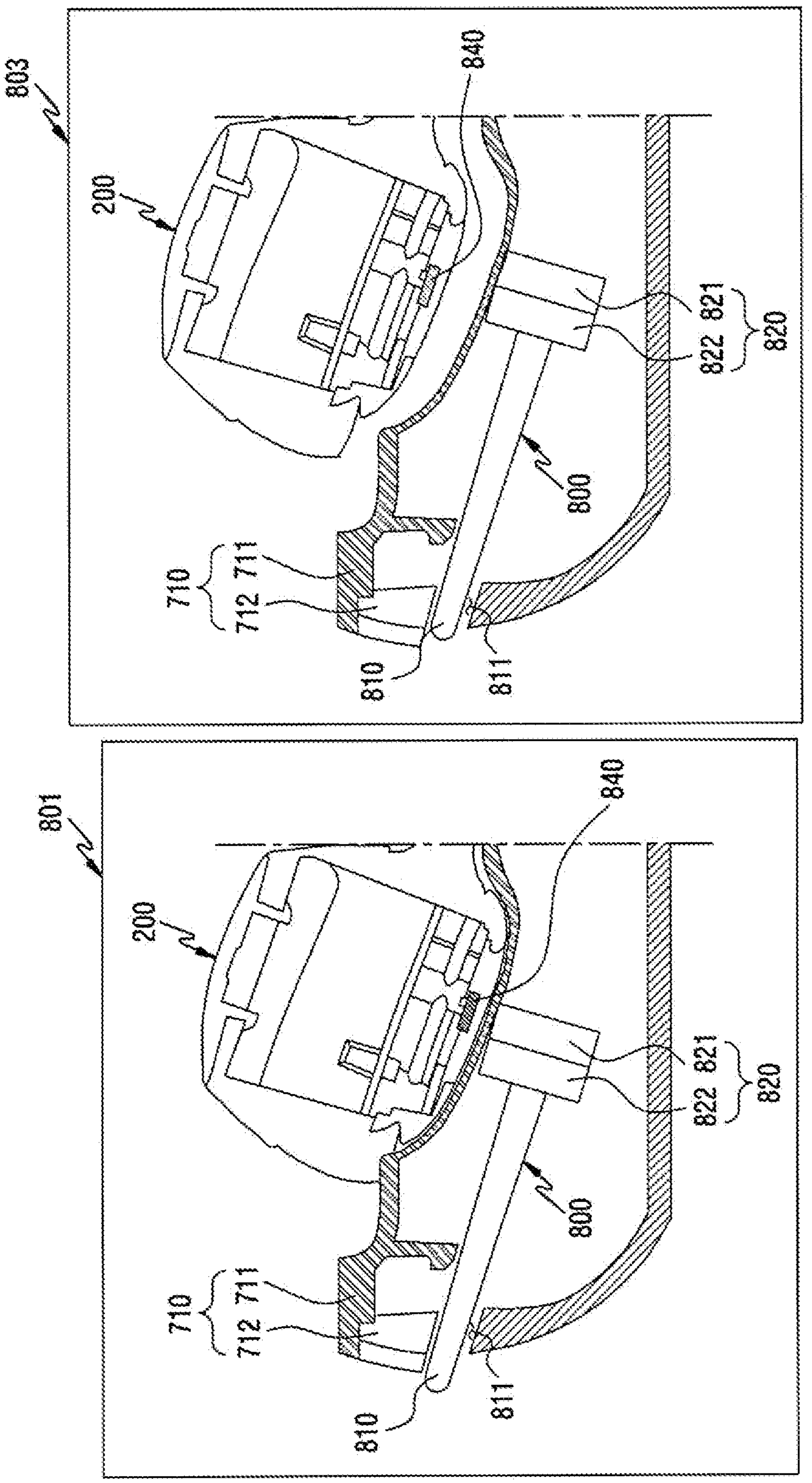
FIG. 8A illustrates an electronic device including a magnetic switch according to an embodiment.
Figure 8B:
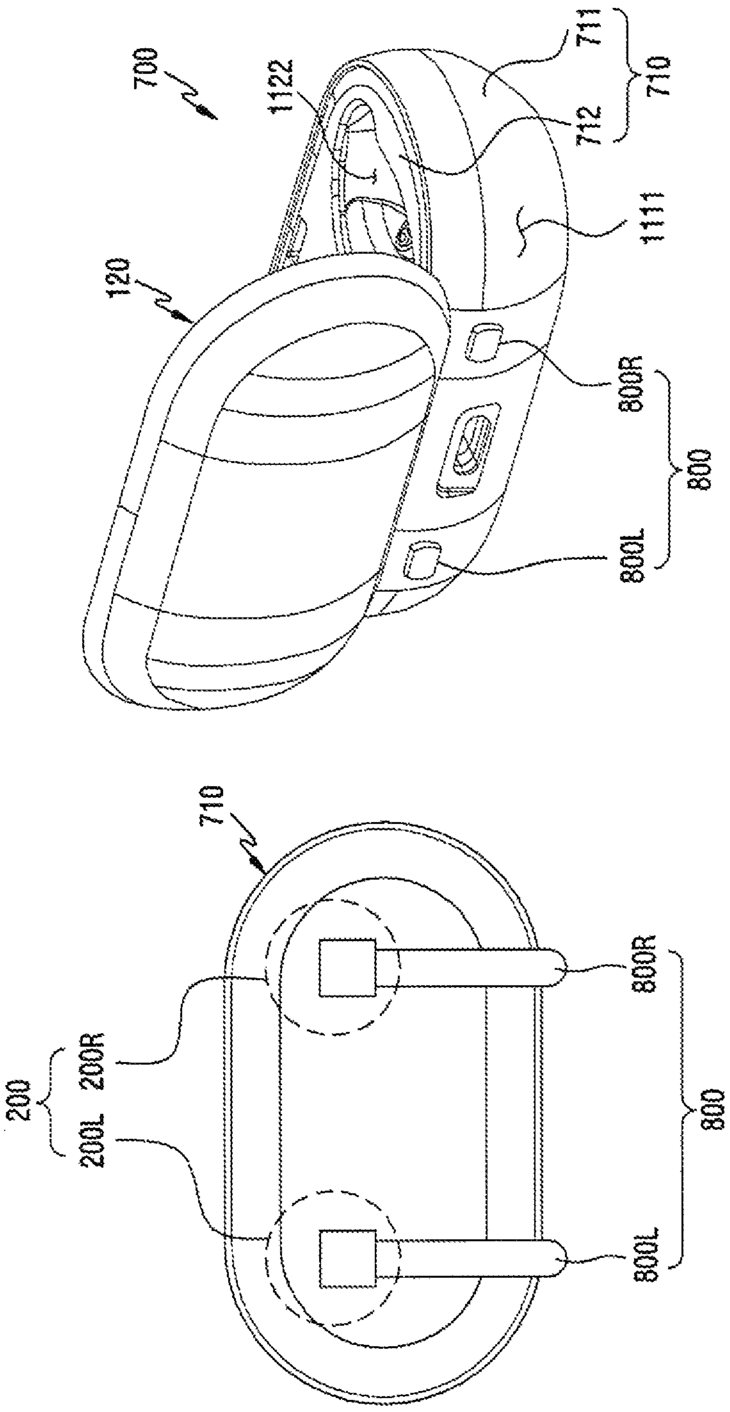
FIG. 8B illustrates an electronic device including a first magnetic switch and a second magnetic switch according to an embodiment.

FIG. 8A illustrates an electronic device 700 including a magnetic switch 800 according to an embodiment. FIG. 8B illustrates an electronic device 700 including a first magnetic switch 800L and a second magnetic switch 800R, according to an embodiment. Reference numeral 801 in FIG. 8A illustrates a first state in which the magnetic switch 800 has not been pressed such that the magnetic switch is in a retracted position relative to a length of opening 811, and reference numeral 803 in FIG. 8A illustrates a second state in which the magnetic switch 800 has been pressed such that it has transitioned to an extended position relative to the length of the opening 811 in which the magnetic switch 800 disposed.

Referring to FIG. 8A, the electronic device 700 according to an embodiment may include a magnetic switch 800.

In an embodiment, the magnetic switch 800 may include a link member 810 and a first magnet 820.

In an embodiment, the link member 810 may be inserted into the opening 811 provided in the body 711. The opening 811 may provide a space through which the link member 810 is movable. One end of the link member 810 may be exposed to the exterior of the housing 710 through the opening 811, and the other end of the link member 810 may be coupled to the first magnet 820.

In an embodiment, the first magnet 820 may include a first portion 821 and a second portion 822.

In the first state in which the magnetic switch 800 is not pressed (801), the first portion 821 of the first magnet 820 may face a second magnet 840 (e.g., the second magnet 320 in FIG. 3) of the external electronic device 200 that is accommodated in the second bracket 721. The first portion 821 of the first magnet 820 may have a pole opposite to that of the second magnet 840 of the external electronic device 200, and the first portion 821 of the first magnet 820 may attract the second magnet 840. The external electronic device 200 may be attracted to the bracket 712 by the first portion 821 of the first magnet 820 and the second magnet 840, and the electronic device 700 may firmly store the external electronic device 200 in a recess (e.g., the recess 1122 in FIG. 1). The position of the magnetic switch 800 in the first state (801) may be referred to as a first position.

In the second state in which the magnetic switch 800 is pressed (803), the second portion 822 of the magnetic switch 800 may face the second magnet 840 of the external electronic device 200 accommodated in the bracket 712. The second portion 822 of the first magnet 820 may have the same pole as the second magnet 840, and a repulsive force may act between the second portion 822 of the first magnet 820 and the second magnet 840. By the second portion 822 of the first magnet 820 and the second magnet 840, the external electronic device 200 may be pushed in a direction away from the bracket 712, and the user may easily take out the external electronic device 200 from recess 1122. The position of the magnetic switch 800 in the second state (803) may be referred to as a second position.

In an embodiment, the magnetic switch 800 may move between the first position and the second position in response to a user input.

Referring to FIG. 8B, the magnetic switch 800 according to an embodiment may be disposed to correspond to the external electronic device 200. For example, when a first external electronic device 200L and a second external electronic device 200R are accommodated in the electronic device 700, the magnetic switch 800 may include a first magnetic switch 800L corresponding to the external electronic device 200L and a second magnetic switch 800R corresponding to the second external electronic device 200R.

In an embodiment, the first magnetic switch 800L and the second magnetic switch 800R may partially protrude to the exterior of the housing 710 so that the user is capable of the magnetic switches.

In an embodiment, the user of the electronic device 700 may selectively operate the first magnetic switch 800L and/or the second magnetic switch 800R, and the user may easily take out the first external electronic device 200L and/or the second external electronic device 200R through the above-described manipulation.

Although FIGS. 8A and 8B have been described with reference to the electronic device 700, the description is also applicable to the electronic device 100 illustrated in FIGS. 1A and 1B in the same or corresponding manner.

Figure 9A:
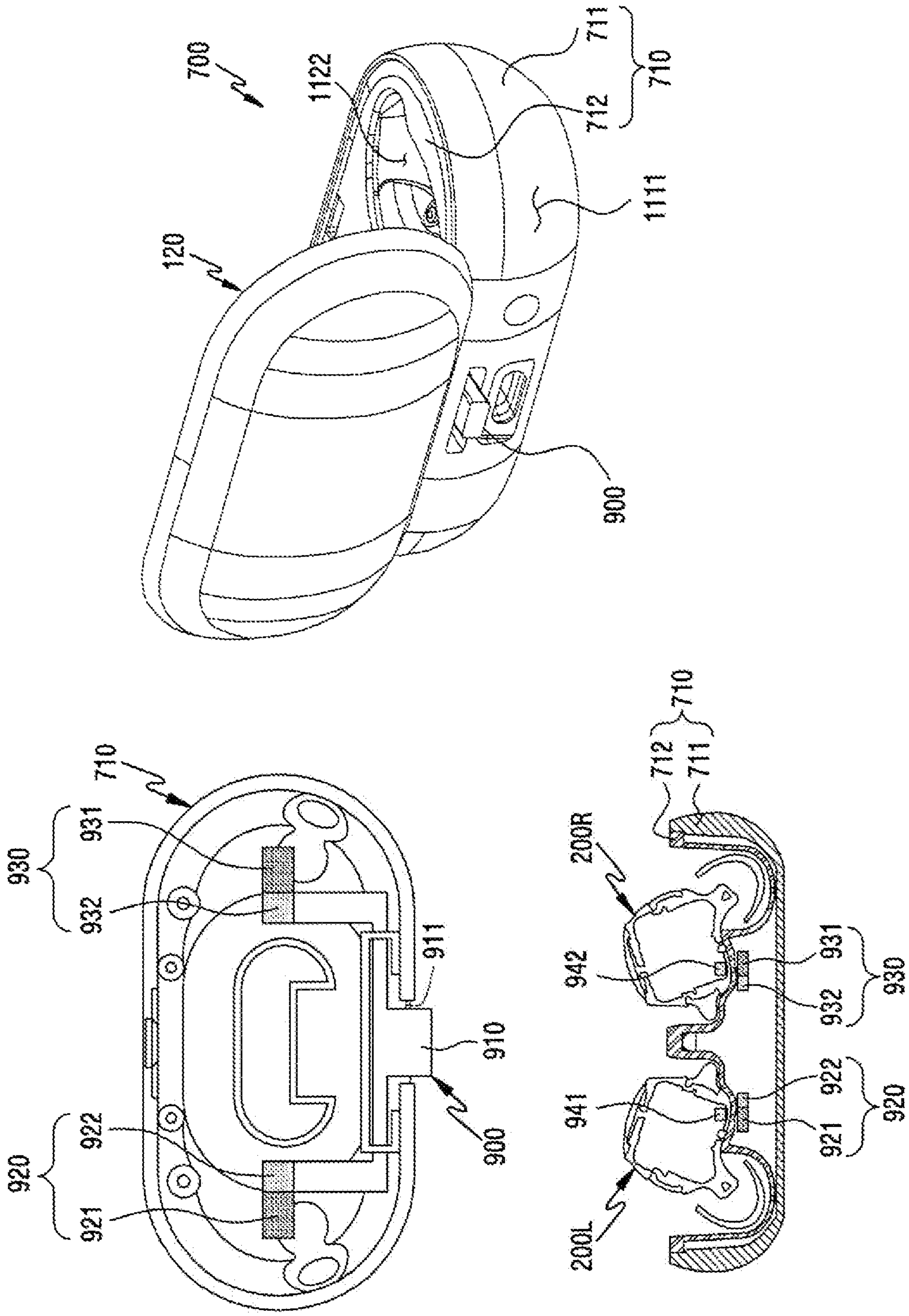
FIG. 9A illustrates an electronic device including a magnetic switch at a first position, according to an embodiment.
Figure 9B:
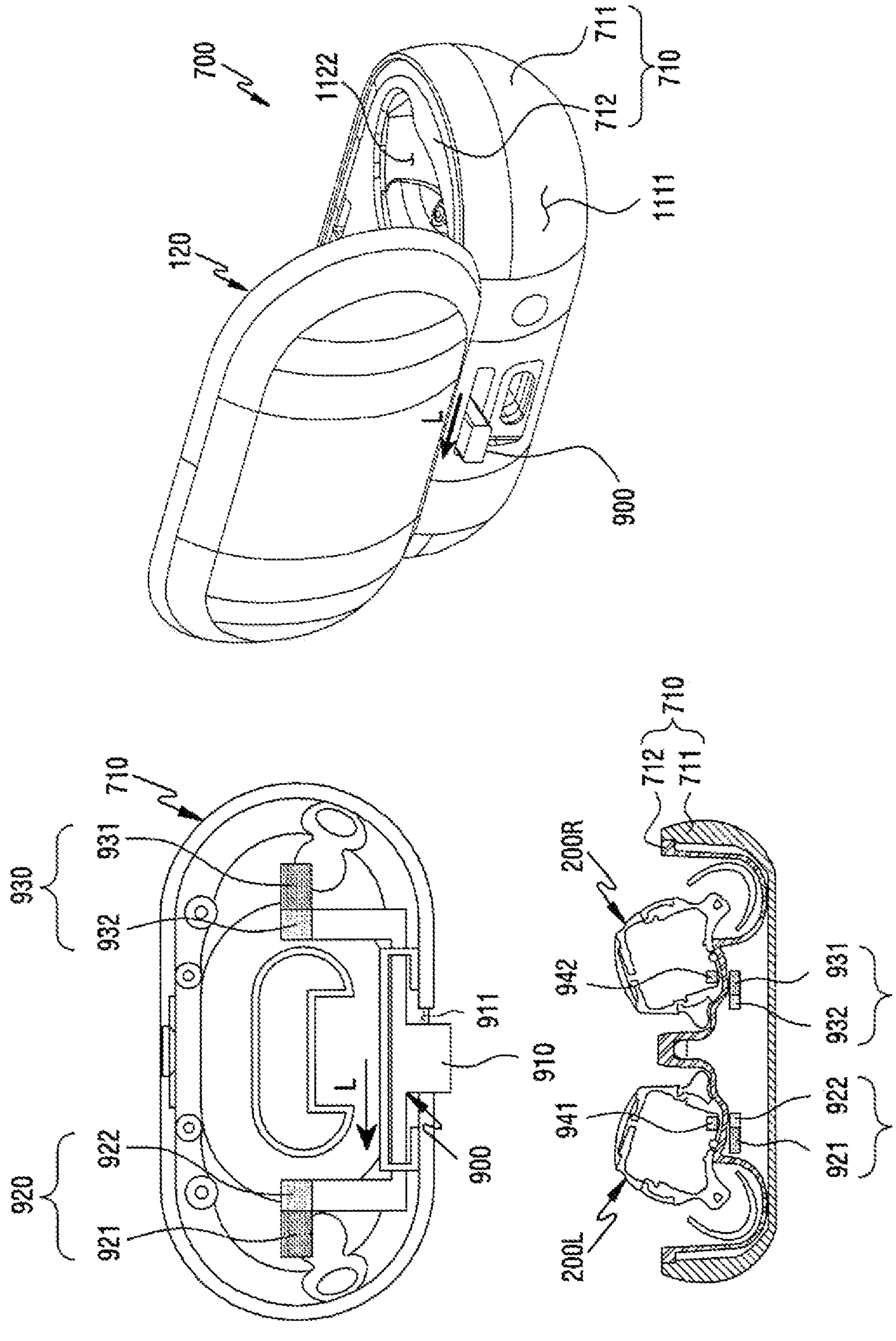
FIG. 9B illustrates an electronic device including a magnetic switch at a second position, according to an embodiment.
Figure 9C:
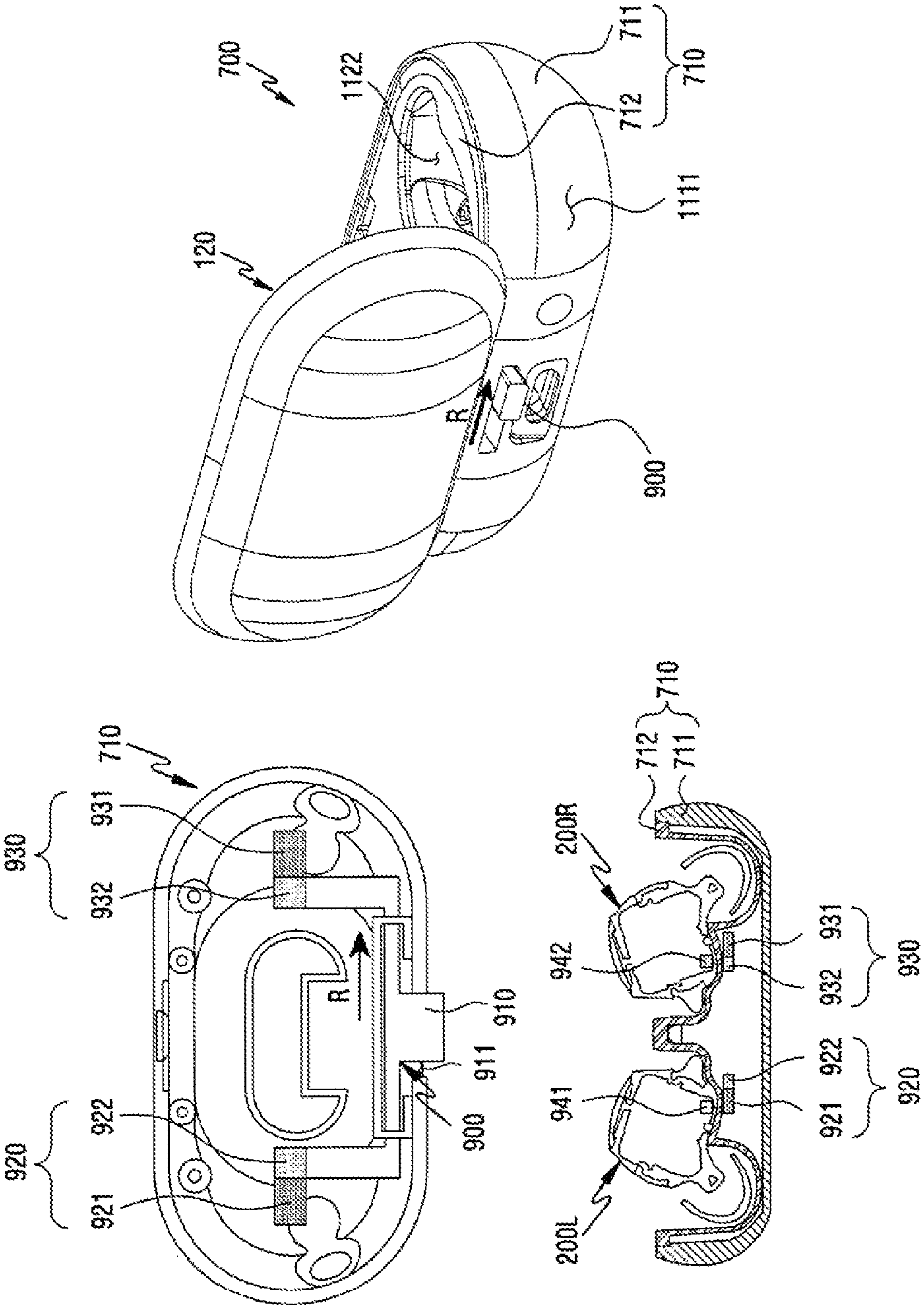
FIG. 9C illustrates an electronic device including a magnetic switch at a third position, according to an embodiment.

In an embodiment, the magnetic switch 800 may be replaced with a magnetic switch 900 illustrated in FIGS. 9A to 9C.

FIG. 9A illustrates an electronic device 700 according to an embodiment including the magnetic switch 900 at a first position.

FIG. 9B illustrates an electronic device 700 according to an embodiment including the magnetic switch 900 at a second position.

FIG. 9C illustrates the electronic device 700 according to an embodiment including the magnetic switch 900 at a third position.

Referring to FIG. 9A, the electronic device 700 according to an embodiment may include the magnetic switch 900.

In an embodiment, the magnetic switch 900 may be disposed within the housing 710. For example, the magnetic switch 900 may be disposed between the body 711 and the bracket 712. A portion of the magnetic switch 900 may pass through an opening 911 provided in the body 711 to be exposed to the exterior of the housing 710.

In an embodiment, the magnetic switch 900 may include a link member 910, a first magnet 920, and a second magnet 930.

In an embodiment, the first end of the link member 910 may be disposed outside the housing 710. The link member 910 may extend from the first end and pass through the opening 911. The link member 910 may extend into the housing 710 through the opening 911. The link member 910 may extend in different directions within the housing 710. For example, a second end of the link member 910 may extend toward the first external electronic device 200L, and a third end of the link member 910 may extend toward the second external electronic device 200R. A first magnet 920 may be coupled to the second end, and a second magnet 930 may be coupled to the third end.

In an embodiment, the first magnet 920 may correspond to the first external electronic device 200L. For example, the first magnet 920 may overlap the third magnet 941 of the first external electronic device 200L in the state in which the first external electronic device 200L is accommodated.

In an embodiment, the second magnet 930 may correspond to the second external electronic device 200R. For example, the second magnet 930 may overlap the fourth magnet 942 of the second external electronic device 200R in the state in which the second external electronic device 200R is accommodated.

In an embodiment, the first magnet 920 may include a first portion 921 and a second portion 922. The first portion 921 of the first magnet 920 may have a pole opposite to that of the third magnet 941 of the first external electronic device 200L. The second portion 922 of the first magnet 920 may have a pole that is the same as that of the third magnet 941 of the first external electronic device 200L. In an embodiment, the first portion 921 of the first magnet 920 may have a larger area than the second portion 922. For example, the first portion 921 of the first magnet 920 may be longer than the second portion 922.

In an embodiment, the second magnet 930 may include a first portion 931 and a second portion 932. The first portion 931 of the second magnet 930 may have a pole opposite to that of the fourth magnet 942 of the second external electronic device 200R. The second portion 932 of the second magnet 930 may have a pole that is the same as that of the fourth magnet 942 of the second external electronic device 200R. In an embodiment, the first portion 931 of the second magnet 930 may have a larger area than the second portion 932. For example, the first portion 931 of the second magnet 930 may be longer than the second portion 932.

In an embodiment, the opening 911 may provide a space through which the link member 910 is movable. For example, the opening 911 may have a larger perimeter than the portion of the link member 910 that passes through the opening 911, and the link member 910 may move within the opening 911. The user may operate the magnetic switch 900 by moving a portion of the link member 910 exposed to the exterior of the housing 710 with a finger.

In an embodiment, the position of the magnetic switch 900 may be changed in response to the user's operation, and the positions of the first magnet 920 and the second magnet 930 of the magnetic switch 900 may be changed.

For example, referring to FIG. 9A, the magnetic switch 900 may be at the first position.

At the first position, the link member 910 may be disposed within the center of the opening 911.

At the first position, the first portion 921 of the first magnet 920 may face the third magnet 941 of the first external electronic device 200L. Since the first portion 921 of the first magnet 920 and the third magnet 941 have different poles, the first external electronic device 200L may be attracted toward the recess 1122.

At the first position, the first portion 921 of the second magnet 930 may face the fourth magnet 942 of the second external electronic device 200R. Since the first portion 931 of the second magnet 930 and the fourth magnet 942 have different poles, the second external electronic device 200R may be attracted toward the recess 1122.

As another example, referring to FIG. 9B, the magnetic switch 900 according to an embodiment may be located at the second position.

At the second position, the magnetic switch 900 may be moved in a first direction (e.g., the L direction) from the first position.

At the second position, the link member 910 may be moved in the first direction (e.g., the L direction) from the first position.

At the second position, the second portion 922 of the first magnet 920 may face the third magnet 941 of the first external electronic device 200L. Since the second portion 922 of the first magnet 920 and the third magnet 941 have the same pole as each other, the first external electronic device 200L may be pushed in a direction away from the recess 1122.

At the second position, the first portion 931 of the second magnet 930 may face the fourth magnet 942 of the second external electronic device 200R. Since the first portion 931 of the second magnet 930 and the fourth magnet 942 have different poles, the second external electronic device 200R may be attracted toward the recess 1122.

The user may easily take out the first external electronic device 200L from the recess 1122 by manipulating the magnetic switch 900 to the second position.

As another example, referring to FIG. 9C, the magnetic switch 900 according to an embodiment may be located at the second position.

At the third position, the magnetic switch 900 may be transitioned or moved from in a second direction (e.g., the R direction) opposite to the first direction the first position.

At the third position, the link member 910 may be moved in the second direction (e.g., the direction indicated by directional arrow R) opposite to the first direction from the first position.

At the third position, the first portion 921 of the first magnet 920 may face the third magnet 941 of the first external electronic device 200L. Since the first portion 921 of the first magnet 920 and the third magnet 941 have opposite poles, the first external electronic device 200L may be attracted toward the recess 1122.

At the third position, the second portion 932 of the second magnet 930 may face the fourth magnet 942 of the second external electronic device 200R. Since the second portion 932 of the second magnet 930 and the fourth magnet 942 have the same pole as each other, the second external electronic device 200R may be pushed in a direction away from the recess 1122.

The user may easily take out the second external electronic device 200R from the recess 1122 by manipulating the magnetic switch 900 to the third position.

In an embodiment, the magnetic switch 900 may be moved between the second position and the third position in response to a user input.

Although FIGS. 9A, 9B, and 9C have been described with reference to the electronic device 700, the description is also applicable to the electronic device 100 illustrated in FIGS. 1A and 1B in the same or corresponding manner.

Figure 10:
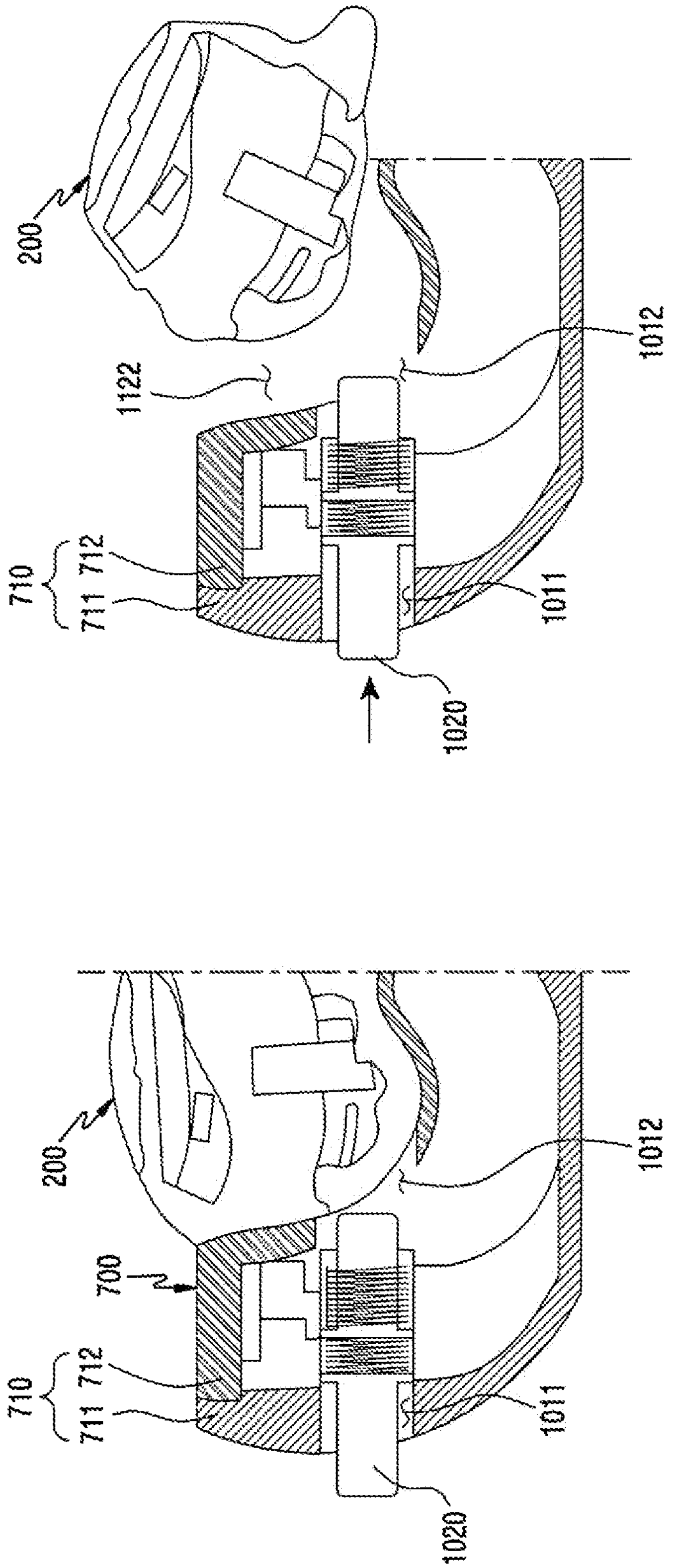
FIG. 10 illustrates an electronic device including a pop-up switch according to an embodiment.

FIG. 10 illustrates an electronic device 700 including a pop-up switch 1020 according to an embodiment.

Figure 11:
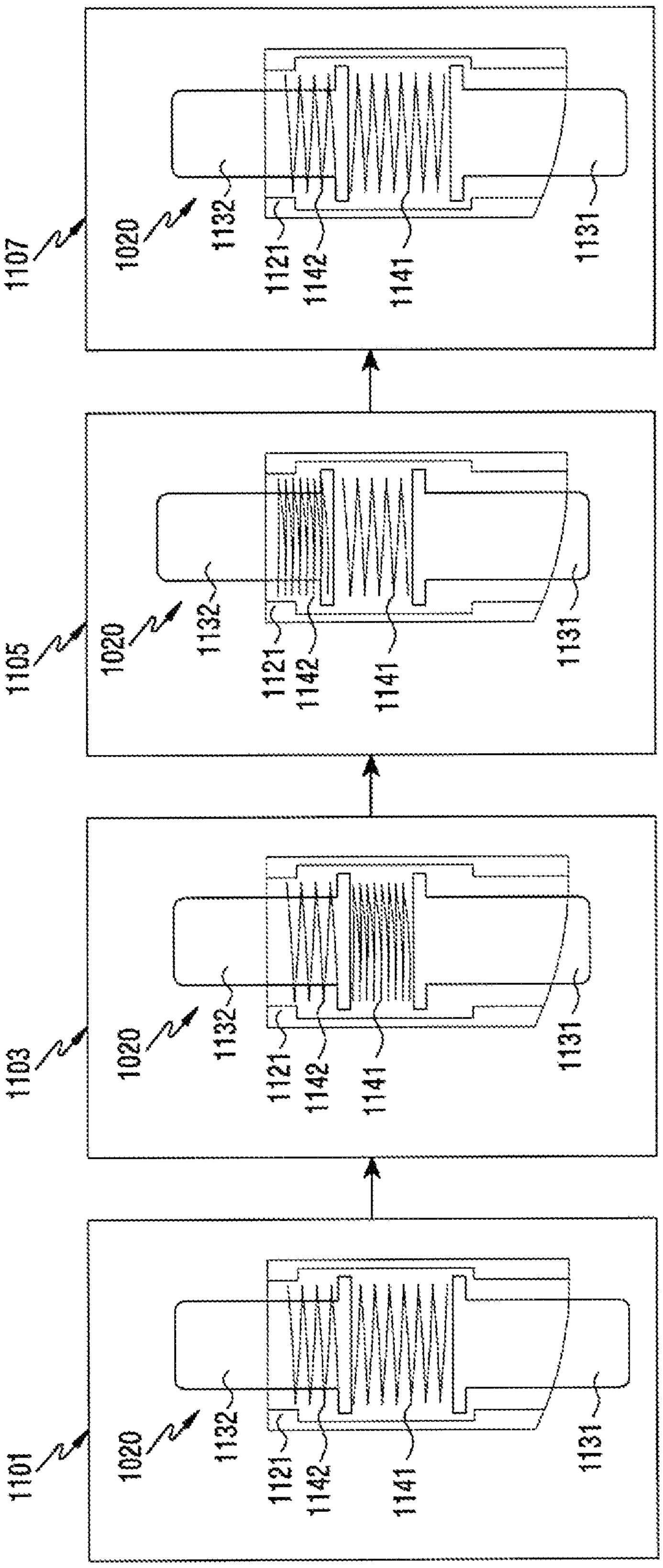
FIG. 11 is a view illustrating the operation of the pop-up switch according to an embodiment.

FIG. 11 is a view illustrating the operation of the pop-up switch 1020 according to an embodiment.

Figure 12:
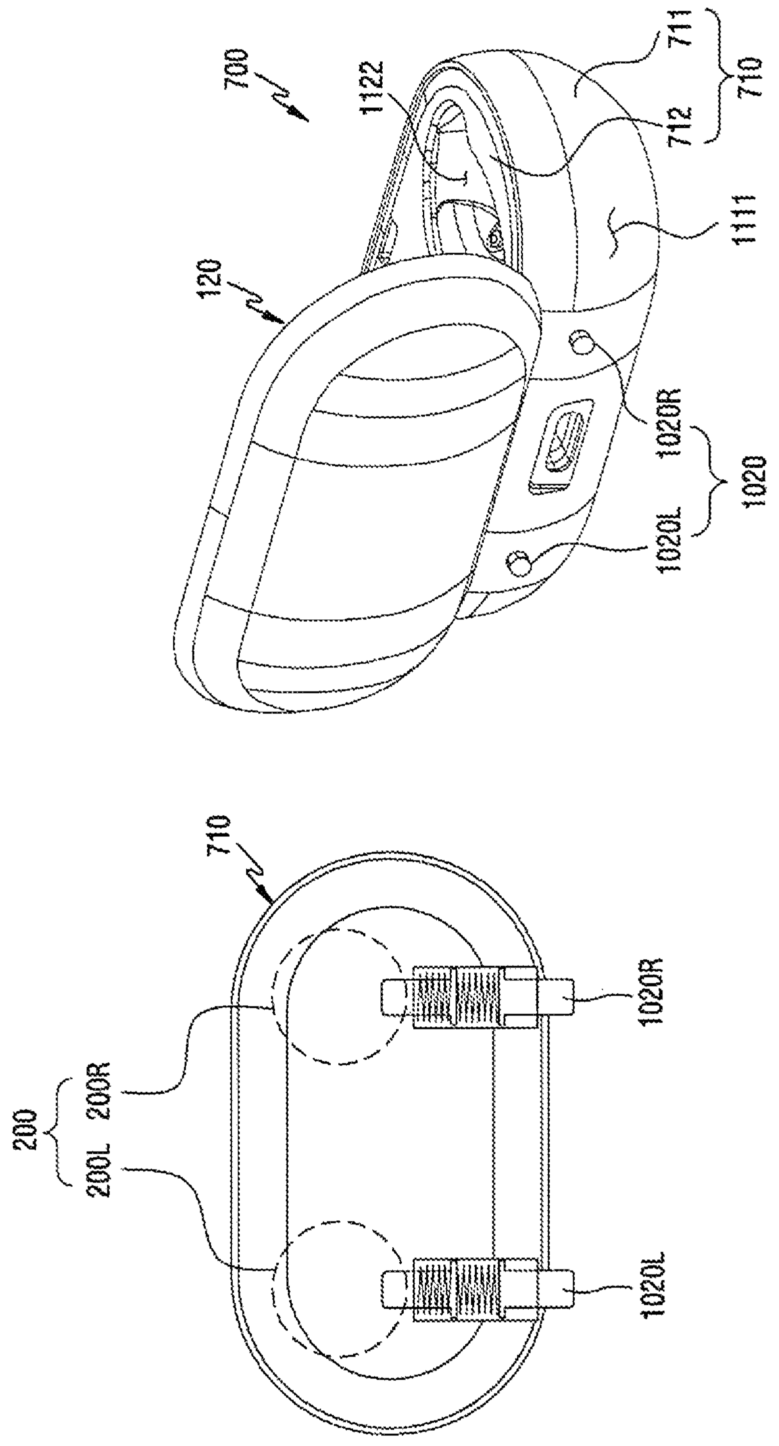
FIG. 12 illustrates an electronic device including a first pop-up switch and a second pop-up switch according to an embodiment.

FIG. 12 illustrates an electronic device 700 including a first pop-up switch 1020L and a second pop-up switch 1020R according to an embodiment.

Referring to FIG. 10, the electronic device 700 may include a pop-up switch 1020. The pop-up switch 1020 may be disposed within the housing 710, and may pass through a first opening 1011 provided in the body 711 and a second opening 1012 provided in the bracket 712. The second opening 1012 may be aligned with the first opening 1011.

In an embodiment, the pop-up switch 1020 may protrude into the recess 1122 through the second opening 1012 in response to a user input. For example, when the user presses the pop-up switch 1020, a portion of the pop-up switch 1020 may be exposed to the exterior of the second opening 1012 toward the recess 1122. In the state in which the external electronic device 200 is accommodated in the recess 1122, the position of the external electronic device 200 may be changed in response to the operation of the pop-up switch 1020. For example, due to the portion of the pop-up switch 1020 that protrudes to the exterior of the second opening 1012, at least a portion of the external electronic device 200 may get (or pop-up) out of the recess 1122. When the external electronic device 200 gets out of the recess 1122, the position of the external electronic device 200 may move away from the bracket 712. When the external electronic device 200 moves away from the bracket 712, the distance between the first magnet 310 in the housing 710 and the second magnet 320 of the external electronic device 200 may increase, and the attractive force between the first magnet 310 and the second magnet 320 may be weakened. When at least a portion of the external electronic device 200 gets out of the recess 1122, the portion of the external electronic device 200 that is exposed to the exterior increases, so that the user may easily pick up the external electronic device 200. The user of the electronic device 700 may easily take out the external electronic device 200 from the recess 1122 by manipulating the pop-up switch 1020.

Referring to FIG. 11, the pop-up switch 1020 may include a casing 1121, a first member 1131, a first elastic member 1141, a second elastic member 1142, and a second member 1132. In an embodiment, the casing 1121 may accommodate the first member 1131, the first elastic member 1141, the second elastic member 1142, and the second member 1132. In an embodiment, the first member 1131 may be disposed in the casing 1121 and may pass through one end of the casing 1121. A portion of the first member 1131 may be engaged with the one end of the casing 1121. In an embodiment, the first elastic member 1141 may be disposed within the casing 1121, and may be disposed between the first member 1131 and the second member 1132. In an embodiment, the second member 1132 may be disposed within the casing 1121, and may pass through the other end of the casing 1121 that is opposite to the one end of the casing 1121 in which the first member 1131 is disposed. The second member 1132 may be disposed such that a portion thereof is engaged with the other end of the casing 1121. In an embodiment, the second elastic member 1142 may be disposed within the casing 1121 and may surround the second member 1132. In an embodiment, the first elastic member 1141 and the second elastic member 1142 may each include a spring, but are not limited thereto.

Referring to reference numeral 1101 of FIG. 11, the pop-up switch 1020 may be in a state in which it is not operated by a user.

Referring to reference numeral 1103 of FIG. 11, when the first member 1131 is pressed, the first member 1131 may move toward the interior of the casing 1121. As the first member 1131 moves, the first elastic member 1141 may be pressed.

Referring to reference numeral 1105 of FIG. 11, the pressed first elastic member 1141 may apply a pressure to the second member 1132 while being restored. For example, in the state in which an external force pressing the first member 1131 is maintained, the force to restore the pressed first elastic member 1141 may be applied toward the second member 1132. The second member 1132 may be moved in a first direction toward the exterior of the casing 1121 by the first elastic member 1141. The first direction may be the direction from the first opening 1011 toward the second opening 1012 in FIG. 10. As illustrated in FIG. 10, the second member 1132 may push the external electronic device 200. As the second member 1132 moves toward the exterior of the casing 1121, the second elastic member 1142 may be pressed.

Referring to the reference numeral 1107 of FIG. 11, while the pressed second elastic member 1142 is restored, the second member 1132 moved in the direction (the first direction) toward the exterior of the casing 1121 may return to its original position. For example, the second member 1132 may be moved in the second direction opposite to the first direction by the restoring force of the second elastic member 1142.

Referring to FIG. 12, the pop-up switch 1020 according to an embodiment may be disposed to correspond to an external electronic device 200. For example, when the first external electronic device 200L and the second external electronic device 200R are accommodated in the electronic device 700, the pop-up switch 1020 may include a first pop-up switch 1020L corresponding to the first external electronic device 200L and a second pop-up switch 1020R corresponding to the second external electronic device 200R.

In an embodiment, the first pop-up switch 1020L and the second pop-up switch 1020R may partially protrude from the housing 710 to be easily pressed by the user.

In an embodiment, the user of the electronic device 700 may selectively operate the first pup-up switch 1020L and/or the second pop-up switch 1020R, and the user may easily take out the first external electronic device 200L and/or the second external electronic device 200R through the above-described manipulation.

According to an embodiment, an electronic device for accommodating a pair of earbuds may include: a housing configured to accommodate a first portion of a bracket; a bracket configured to provide a resting space in which the earbuds are at least partially accommodated; and a cover rotatably connected to the housing and configured to cover an upper portion of the bracket such that the seating space or the earbuds accommodated in the seating space are not exposed to exterior, wherein a second portion of the bracket may be exposed to the exterior of the housing while covering a portion of an edge of the housing, and may include at least one protrusion that protrudes inward toward the edge of the housing, the edge of the housing may be provided with at least one groove, which corresponds to the at least one protrusion and may provide a space in which the at least one protrusion is movable, and the bracket may be configured to move between a first position and a second position depending on positions of the at least one groove and the at least one protrusion.

The electronic device according to an embodiment may further include at least one first magnet disposed between the housing and the bracket, wherein the at least one first magnet may overlap at least one second magnet included in the earbuds in a state in which the earbuds are accommodated in the seating space of the bracket.

In an embodiment, the bracket may have a first distance from the at least one first magnet at the first position and a second distance greater than the first distance from the at least one first magnet at the second position.

In an embodiment, in the state in which the earbuds are at least partially accommodated in the seating space, the distance between the at least one first magnet and the at least one second magnet may be greater when the bracket is located at the second position than when the bracket is located at the first position.

In an embodiment, the at least one groove may extend along an edge of the housing in a height direction by a predetermined length.

In an embodiment, the at least one protrusion may include a first protrusion and a second protrusion provided at a position facing the first protrusion in the second portion of the bracket, and the at least one groove may include a first groove corresponding to the first protrusion and a second groove corresponding to the second protrusion.

The electronic device according to an embodiment may include a link member, wherein one end of the link member may be coupled to the cover, and extend to a space between the bracket and the housing from the one end.

In an embodiment, the link member may rotate around the one end in response to the opening/closing operation of the cover.

In an embodiment, the link member may push up the bracket such that the bracket moves from the first position to the second position in response to the operation of opening the cover.

In an embodiment, the link member may include at least one bent portion.

According to an embodiment, a case for accommodating at least one earbuds may include: a housing configured to provide at least one recess in which at least a portion of the at least one earbud is accommodated, wherein the housing includes an opening providing a space through which the magnetic switch is movable; the magnetic switch disposed within the housing and including a first magnet, wherein the magnetic switch passes through the opening such that a portion thereof is exposed to exterior of the housing; and a cover rotatably coupled to the housing and configured to cover the housing such that the at least one recess or the at least one earbud accommodated in the at least one recess is not exposed to the exterior, wherein the first magnet may overlap a second magnet included in the at least one earbud in a state in which the at least one earbud is accommodated in the at least one recess, and the magnetic switch may be configured to move between a first position and a second position through the opening such that an overlapping region between the first magnet and the second magnet varies.

In an embodiment, the first magnet may include a first portion and a second portion, and in the state in which the at least one earbud is accommodated in the at least one recess, the first portion of the first magnet overlaps the second magnet at the first position, and in the state in which the at least one earbud is accommodated in the at least one recess, the second portion of the first magnet may overlap the second magnet at the second position.

In an embodiment, the first portion of the first magnet may have an opposite pole to the second magnet such that they attract one another, and the second portion of the first magnet may have the same pole as the second magnet such that they repel one another.

In an embodiment, the magnetic switch may include a link member, a portion of the link member may be exposed to the exterior of the housing through the opening, and a remaining portion of the link member except for the portion extends from the portion to interior of the housing, and the first magnet may be coupled to the remaining portion of the link member.

In an embodiment, the at least one earbud may include a first earbud and a second earbud, the at least one recess may include a first recess in which the first earbud is seated and a second recess in which the second earbud is seated, the second magnet may be included in the first earbud, the magnetic switch includes a third magnet, and the magnetic switch may include a third magnet and may be configured to move between the first position and the second position such that an overlapping region between the third magnet and a fourth magnet included in the second earbud varies depending on the relative positioning of the magnets.

In an embodiment, the third magnet may include a third portion having a pole opposite to that of the fourth magnet and a fourth portion having the same pole as the fourth magnet, wherein, in the state in which the at least one earbud is accommodated in the at least one recess, the fourth portion of the third magnet overlaps the fourth magnet at the first position, and in the state in which the at least one earbud is accommodated in the at least one recess, the third portion of the third magnet overlaps the fourth magnet at the second position.

In an embodiment, the magnetic switch may include a link member, the first portion of the link member may be exposed to the exterior of the housing through the opening, the second portion of the link member may extend from the first portion toward the first recess, the third portion of the link member may extend from the first portion toward the second recess, the first magnet may be coupled to one end of the second portion, and the third magnet may be coupled to one end of the third portion.

According to an embodiment, a case for accommodating a wireless sound output device may include: a housing configured to provide a recess in which at least a portion of the wireless sound output device is accommodated, wherein the housing includes a first opening and a second opening aligned with the first opening and provided in the recess; and a pop-up switch passing through the first opening and disposed within the housing to be aligned with the second opening, wherein the pop-up switch may protrude into the recess through the second opening in response to a user input such that at least a portion of the wireless sound output device pops up out of the recess.

In an embodiment, the pop-up switch may include: a casing including a through hole; a first member disposed inside the casing to be engaged with one end of the through hole, wherein a portion of the first member is exposed to exterior of the housing; a second member disposed inside the casing to be engaged with another end of the through hole; a first elastic member disposed between the first member and the second member; and a second elastic member disposed in the casing and surrounding the second member.

In an embodiment, the first member may move in a first direction from the first opening toward the second opening in response to the user input, the first elastic member may be pressed by the first member moved in the first direction, the second member may be moved in the first direction by a restoring force of the pressed first elastic member, a portion of the second member may protrude into the recess through the second opening in a state of being moved in the first direction, the second elastic member may be pressed by the second member protruding in the first direction, and the second member may be moved in a second direction opposite to the first direction by a restoring force of the pressed second elastic member.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof

What is claimed is:

1. An electronic device for accommodating at least one earbud, the electronic device comprising:

a housing configured to accommodate a first portion of a bracket, the bracket configured to provide a resting space in which the at least one earbud is at least partially accommodated; and a cover rotatably connected to the housing and configured to cover the second portion of the bracket such that the seating space or the earbuds accommodated in the seating space are not exposed to exterior, wherein a second portion of the bracket is exposed to an exterior of the housing while covering an edge portion of the housing, and includes at least one protrusion that protrudes inward toward the edge of the housing, the edge portion of the housing includes at least one groove, which corresponds to the at least one protrusion and provides a space in which the at least one protrusion is movable, and the bracket transitions between a first position and a second position depending on positions of the at least one groove and the at least one protrusion.

2. The electronic device of claim 1, further comprising:

at least one first magnet disposed between the housing and the bracket, wherein the at least one first magnet overlaps at least one second magnet included in the at least one earbud in a state in which the at least one earbud is accommodated in the seating space of the bracket.

3. The electronic device of claim 2, wherein the bracket has a first distance from the at least one first magnet at the first position and a second distance greater than the first distance from the at least one first magnet at the second position.

4. The electronic device of claim 2, wherein, in the state in which the at least one earbud is at least partially accommodated in the seating space, a distance between the at least one first magnet and the at least one second magnet is greater when the bracket is located at the second position than when the bracket is located at the first position.

5. The electronic device of claim 2, further comprising:

a link member, wherein one end of the link member is coupled to the cover, and extends to a space between the bracket and the housing from the one end.

6. The electronic device of claim 1, wherein the at least one groove extends along an edge of the housing in a height direction by a predetermined length.

7. The electronic device of claim 1, wherein the at least one protrusion includes a first protrusion and a second protrusion provided at a position facing the first protrusion in the second portion of the bracket, and the at least one groove includes a first groove corresponding to the first protrusion and a second groove corresponding to the second protrusion.

8. A case for receiving at least one earbud, the case comprising:

a housing configured to provide at least one recess in which at least a portion of the at least one earbud is accommodated, wherein the housing includes an opening providing a space through which a magnetic switch is movable;

the magnetic switch disposed within the housing and including a first magnet, wherein the magnetic switch passes through the opening such that a portion of the magnetic switch is exposed to exterior of the housing; and a cover rotatably coupled to the housing and configured to cover a space defined by the at least one recess, wherein the first magnet overlaps a second magnet included in the at least one earbud in a state in which the at least one earbud is accommodated in the at least one recess, and the magnetic switch is configured to transition between a first position and a second position through the opening such that the first magnet and the second magnet define an overlapping region that varies as the magnetic switch transitions between the first position and the second position and therebetween.

9. The case of claim 8, wherein the first magnet includes a first portion and a second portion, and in the state in which the at least one earbud is accommodated in the at least one recess, the first portion of the first magnet overlaps the second magnet at the first position and the second portion of the first magnet overlaps the second magnet at the second position.

10. The case of claim 9, wherein the first portion of the first magnet has an opposite pole to the second magnet, and the second portion of the first magnet has a same pole as the second magnet.

11. The case of claim 9, wherein the at least one earbud includes a first earbud and a second earbud, the at least one recess includes a first recess in which the first earbud is seated and a second recess in which the second earbud is seated, the second magnet is included in the first earbud, and the magnetic switch includes a third magnet and is configured to move between the first position and the second position such that an overlapping region between the third magnet and a fourth magnet included in the second earbud varies.

12. The case of claim 8, wherein the magnetic switch includes a link member, a portion of the link member is exposed to the exterior of the housing through the opening, and a remaining portion of the link member except for the portion extends from the portion to interior of the housing, and the first magnet is coupled to the remaining portion of the link member.

13. A case for accommodating a wireless sound output device, the case comprising:

a housing configured to provide a recess in which at least a portion of the wireless sound output device is accommodated, wherein the housing includes a first opening and a second opening aligned with the first opening and provided in the recess; and a pop-up switch passing through the first opening and disposed within the housing to be aligned with the second opening, wherein the pop-up switch protrudes into the recess through the second opening in response to a user input such that at least a portion of the wireless sound output device pops up out of the recess.

14. The case of claim 13, wherein the pop-up switch includes:

a casing including a through hole;

a first member disposed inside the casing to be engaged with one end of the through hole, wherein a portion of the first member is exposed to exterior of the housing;

a second member disposed inside the casing to be engaged with another end of the through hole;

a first elastic member disposed between the first member and the second member; and a second elastic member disposed in the casing and surrounding the second member.

15. The case of claim 14, wherein:

the first member moves in a first direction from the first opening toward the second opening in response to the user input;

the first elastic member is pressed by the first member moved in the first direction;

the second member is moved in the first direction by a restoring force of first elastic member after having been pressed;

a portion of the second member protrudes into the recess through the second opening in a state of being moved in the first direction;

the second elastic member is pressed by the second member protruding in the first direction; and the second member is moved in a second direction opposite to the first direction by a restoring force of the second elastic member after having been pressed.

* * * * *